(12) United States Patent
Müller

(10) Patent No.: US 7,314,234 B2
(45) Date of Patent: Jan. 1, 2008

(54) STEERING COLUMN AND ADJUSTMENT METHOD FOR A STEERING COLUMN

(75) Inventor: Olaf Müller, Rüsselsheim (DE)

(73) Assignee: Thyssenkrupp Presta AG, Eschen (LI)

(*) Notice: Subject to any disclaimer, the term of this patent is extended or adjusted under 35 U.S.C. 154(b) by 287 days.

(21) Appl. No.: 10/771,846

(22) Filed: Feb. 3, 2004

(65) Prior Publication Data

US 2004/0211612 A1 Oct. 28, 2004

Related U.S. Application Data

(63) Continuation-in-part of application No. 10/018,206, filed as application No. PCT/DE00/01889 on Jun. 9, 2000, now abandoned, application No. 10/771,846, which is a continuation of application No. 10/031,080, filed as application No. PCT/DE00/02286 on Jul. 13, 2000, now abandoned.

(30) Foreign Application Priority Data

| May 11, 1998 | (DE) | ............................ 298 08 317 U |
| Jan. 9, 1999 | (DE) | ............................ 299 00 289 U |
| Feb. 3, 1999 | (DE) | ............................ 299 01 657 U |

(51) Int. Cl.
*B62D 1/19* (2006.01)

(52) U.S. Cl. ........................................ 280/777; 74/493

(58) Field of Classification Search ................ 280/777, 280/779; 74/493; *B62B 1/11, 1/19*
See application file for complete search history.

(56) References Cited

U.S. PATENT DOCUMENTS 4,886,295 A 12/1989 Browne (Continued)

FOREIGN PATENT DOCUMENTS

DE 198 29 237 A1 1/1999

(Continued)

*Primary Examiner*—Eric Culbreth
(74) *Attorney, Agent, or Firm*—Martin Fleit; Paul D. Bianco; Fleit Kain Gibbons Gutman Bongini & Bianco, P.L.

(57) ABSTRACT

A steering column for a motor vehicle with adjustment which can be triggered in the case of an accident to move at least a steering wheel end region of the steering column away from a passenger wherein the adjustment include load absorbing to absorb a movement of at least the steering wheel end region of the steering column away from a passenger. An alternative, a steering column for a motor vehicle with adjustment which can be triggered in the case of an accident to move at least a steering wheel end region of the steering column away from a passenger wherein the adjustment is designed for at least two operation modes and wherein a control is provided to record passenger's parameters by detector and to trigger an operation mode of the adjustment in dependence on the passenger's parameters. An adjustment method for a steering column of a motor vehicle wherein in the case of an accident at least a steering wheel end region of the steering column is moved away from a passenger by means of adjustment. The passenger's parameters are sensed by a detector and movement of at least the steering wheel end region of the steering column away from the passenger takes place in dependence on the passenger's parameters according to one operation mode out of several operation modes of the adjustment.

58 Claims, 16 Drawing Sheets

U.S. PATENT DOCUMENTS

| | | |
|---|---|---|
| 4,941,679 A | 7/1990 | Baumann et al. |
| 4,968,058 A | 11/1990 | Jones |
| 5,295,712 A | 3/1994 | Omura |
| 5,618,058 A | 4/1997 | Byon |
| 5,769,454 A | 6/1998 | Duval et al. |
| 5,893,580 A | 4/1999 | Hoagland et al. |
| 6,134,982 A | 10/2000 | Takabatake |
| 6,152,488 A | 11/2000 | Hedderly et al. |
| 6,170,862 B1 | 1/2001 | Hoagland et al. |
| 6,170,874 B1 | 1/2001 | Fosse |
| 6,189,919 B1 | 2/2001 | Sinnhuber et al. |
| 6,241,284 B1 | 6/2001 | De Verdier et al. |
| 6,585,294 B1 | 7/2003 | Faulstroh et al. |

FOREIGN PATENT DOCUMENTS

| | | |
|---|---|---|
| GB | 1362899 | 8/1974 |
| WO | WO 98/22325 A1 | 6/1998 |
| WO | WO 98/58831 | 12/1998 |

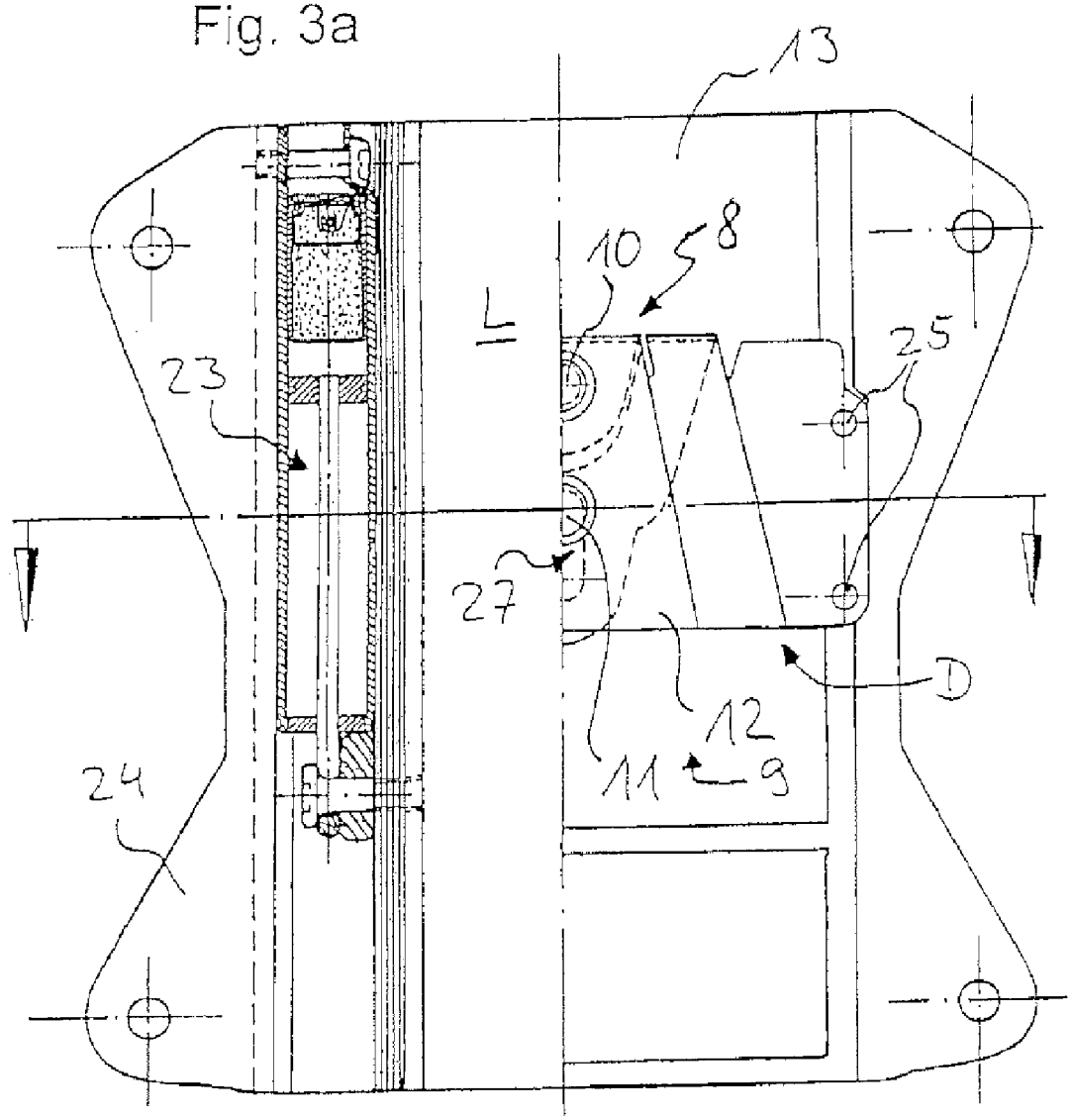

Active Safety Steering Column
Unbelted 5 % Woman

STEERING COLUMN AND ADJUSTMENT METHOD FOR A STEERING COLUMN

RELATED APPLICATIONS

This application is a continuation-in-part of U.S. application Ser. No. 10/018,206 filed Mar. 22, 2002 now abandoned, which was filed as the National Stage of International Application No. PCT/DE00/01889, filed Jun. 9, 2000, and a continuation of U.S. application Ser. No. 10/031,080 filed May 10, 2002 now abandoned, which was filed as a National Stage of International Application No. PCT/DE00/02286, filed Jul. 13, 2000, which applications claim priority under 35 USC 119 from German applications 298 08 317.5 filed May 11, 1998, 299 01 657.9 filed Feb. 3, 1999 and 299 00 289.6 filed Jan. 9, 1999, the contents of all of which documents are here incorporated by reference in their entirety. Applicant claims the benefit of 35 USC 120.

BACKGROUND OF THE INVENTION

1. Field of the Invention

The invention relates to a steering column, as well as, an adjustment method for a steering column.

2. Prior Art

The prior German utility model applications 298 08 317.5, 299 01 657.9 and 299 00 289.6 as well as the PCT application PCT/DE 99/01000 based there upon and the PCT application PCT/DE 00/01889, relating to the present applicant/owner, generally deal with a safety steering column, a safety system for a motor vehicle, a motor vehicle with a safety system as well as a safety method, each to protect passengers in the case of an accident.

SUMMARY OF THE INVENTION

The present invention relates to improvements of the complete techniques and embodiment examples dealt with in the prior application, in particular with reference to the triggering control of the steering column and especially for different passengers and seat belt fastening conditions. So far, the complete disclosure of these prior applications, in particular with reference to the triggering control of the steering column and especially for different passengers and seat belt fastening conditions, is herewith completely included in the present document by the references.

For example, from the mentioned prior applications a vehicle steering column is known which will be adjusted in the case of an accident so that in any case the end on the side of the steering wheel will be moved away from a passenger.

The present invention has the object to further improve this steering column and its adjustment method for the passengers' protection.

This object is achieved with a steering column for a motor vehicle with adjustment means which can be triggered in the case of an accident to move at least a steering wheel end region of the steering column away from a passenger, characterized in that the adjustment means (3) include load absorbing means (7) to absorb a movement of at least the steering wheel end region (2) of the steering wheel (1) away from a passenger. Also, this object is achieved with a steering column for a motor vehicle with adjustment means which can be triggered in the case of an accident to move at least a steering wheel end region of the steering column away from a passenger, characterized in that the adjustment means (3) are designed for at least two operation modes and that a control (5) is provided to sense passenger's parameters by means of detection means (6) and to trigger one operation mode of the adjustment means (3) in dependence on the passenge's parameter. Also, this object is achieved with an adjustment method for a steering column of a vehicle wherein in the case of an accident at least one steering wheel end region of the steering column is moved away from a passenger by means of adjustment means, characterized in that passenger's parameters are recorded by means of detection means (6), and in that the movement of at least the steering wheel end region (2) of the steering column (1) away from the passenger takes place in dependence on the passenger's parameters according to one operation mode out of several operation modes of the adjustment means (3). See FIG. 2 of drawing.

The object of the invention is further achieved by a safety steering column system for a motor vehicle that can be selectively configured upon entry into the motor vehicle of a driver in the event of an accident to control the movement of at least a steering wheel end region of the steering column away from the driver of the vehicle correlated to a driver's configuring parameters comprising (a) a steering column comprised of an upper and a lower telescoping parts with the upper part including the steering wheel end region, with the telescoping parts of the steering column being mounted for telescoping toward the front of the vehicle, (b) an adjustment mechanism intercoupling the telescoping parts of the steering column, (c) a first sensing device for sensing a physical parameter related to the size of the driver when the driver has entered the motor vehicle and providing a first configuring output, (d) a second sensing device for sensing a seat belt parameter of whether the driver who is seated in the motor vehicle has a seat belt fastened and providing a second configuring output, (e) the adjustment mechanism including a lockable load absorber, (ii) a triggerable unlocking device associated with the load absorber that when triggered unlocks the load absorber, and (iii) at least one triggerable operator that when triggered positively moves the telescoping parts of the steering column together away from the driver, and (f) a controller for receiving the outputs from the sensing devices and responsive to the received outputs for configuring the adjustment mechanism, when the driver enters the motor vehicle and prior to any accident, by controlling the triggerable unlocking device and the triggerable operator so that the adjustment mechanism operates to operate according to one of at least three preselected different and distinct operations.

Still further, the safety steering column system according to the above may have the adjustment mechanism including an energy generator for the operator. The energy generator can be one of a pyrotechnic gas generator and an electrical device. Also, a pair of lockable load absorbers are provided, capable of being operated individually or simultaneously. The load absorbers can have different absorbencies The load absorber can include a deformation member. The deformation member can be comprised of one of a cutting knife, material deforming bolts, and a deceleration carriage having at least two deceleration force steps.

Still further, the safety steering column system according to the above can have sensors sense and provide outputs to the controller of the driver's seat position, seat belt fastened status, driver's size, and at least one of driver's weight and driver's posture. Also, the controller can trigger the operator in dependence on the driver's seat position. The controller can be responsive to a sensed output that is indicative of a predetermined distance or less between the driver and the steering wheel to condition the adjustment mechanism to trigger in case of an accident. Also, the controller conditions the load absorber responsive to the output of the sensor for one of the driver's seat belt fastening status and seat position. Also, the controller can condition the adjustment mechanism in the case of an accident by unlocking the load absorber responsive to the driver not wearing the seat belt.

In the safety steering column system according to the invention, the first sensing device can include one of an electrical switch and optical switch juxtaposed with respect to seat guiding rails. Also, the second sensing device can include one of an electrical and optical buckle usage switch juxtaposed with respect to the seat belt buckle for the driver's seat belt.

The invention further contemplates a safety steering column system for a motor vehicle that can be selectively configured upon entry into the motor vehicle of a driver in the event of an accident to control the movement of at least a steering wheel end region of the steering column away from the driver of the vehicle correlated to a driver's configuring parameters comprising, (a) a steering column comprised of an upper and a lower telescoping part with the upper part including the steering wheel end region, with the telescoping parts of the steering column being mounted for telescoping toward the front of the vehicle, (b) an adjustment mechanism intereoupling the telescoping parts of the steering column, (c) a first sensing device for sensing a physical parameter related to the size of the driver when the driver has entered the motor vehicle and providing a first configuring output, (d) a second sensing device for sensing a seat belt parameter of whether the driver who is seated in the motor vehicle has a seat belt fastened and providing a second configuring output, (e) the adjustment mechanism including a pair of load absorbers having different load absorbency, a lock associated with each load absorber, (ii) a triggerable unlocking device associated with each lock that when triggered unlocks the associated lock, and (iii) at least one operator including a triggerable device to generate energy for the operator so that when the device is triggered and energy is generated to drive the operator, the operator will positively move the telescoping pans of the steering column together away from the driver, and (f) a controller for receiving the outputs from the sensing devices and responsive to the received outputs for configuring the adjustment mechanism, when the driver enters the motor vehicle and prior to any accident, by controlling the triggerable unlocking device and the triggerable operator so that the adjustment mechanism operates to operate according to one of at least three preselected different and distinct operations.

The safety steering column system according to the preceding paragraph can have the adjustment mechanism including an energy generator for the operator. The energy generator can be one of a pyrotechnic gas generator and an electrical device. The load absorbers can include a deformation member. The deformation members can be comprised of one of material deforming bolts, a deceleration carriage having at least two deceleration force steps and combinations thereof. The sensors can sense and provide outputs to the controller of the driver's seat position, seat belt fastened status, driver's size, and at least one of driver's weight and driver's posture. The controller can trigger the operator in dependence on the driver's seat position. The controller can be responsive to a sensed output that is indicative of a predetermined distance or less between the driver and the steering wheel to condition the adjustment mechanism to trigger in case of an accident. The controller can condition the load absorbers responsive to the output of the sensor for one of the driver's seat belt fastening status and seat position. The controller can condition the adjustment mechanism in the case of an accident by unlocking the load absorber responsive to the driver not wearing a seat belt. Also, the first sensing device can include one of an electrical switch and optical switch juxtaposed with respect to seat guiding rails. The second sensing device can include one of an electrical and optical buckle usage switch juxtaposed with respect to the seat belt buckle for the driver's seat belt. The first sensing device can sense one of weight and height of the driver.

The invention further contemplates a bolt mechanism located within a load absorber that can be selectively configured to positively trigger and make the bolt ineffective in the operation of the load absorber comprising, (a) a bolt mechanism including, a metal rod or bolt housed within a load absorber, (ii) a bolt lock associated with the metal rod or bolt, (iii) a triggerable bolt unlocking device associated with the metal rod or bolt that when triggered unlocks the associated bolt lock, and (iv) a bolt operator including a triggerable bolt device to generate energy for the bolt operator so that when the bolt device is triggered and energy is generated to drive the bolt operator, the bolt operator will positively move the metal rod or bolt, (b) a first sensing device for sensing a physical parameter related to the size of the driver when the driver has entered the motor vehicle and providing a first configuring output, (c) a second sensing device for sensing a seat belt parameter of whether the driver who is seated in the motor vehicle has a seat belt fastened and providing a second configuring output, and (d) a controller for receiving the outputs from the sensing devices and responsive to the received outputs for configuring the bolt mechanism, when the driver enters the motor vehicle and prior to any accident, by controlling the triggerable unlocking bolt device and the triggerable bolt operator so that the bolt mechanism operates to operate according to one of at least two preselected different and distinct operations.

The bolt mechanism can include an energy generator for the bolt operator. The energy generator can be an electrical device. The sensors can sense and provide outputs to the controller of the driver's seat position, seat belt fastened status, driver's size, and at least one of driver's weight and driver's posture. The controller can trigger the bolt operator in dependence on the driver's seat position. The controller can be responsive to a sensed output that is indicative of a predetermined distance or less between the driver and the steering wheel to condition the bolt mechanism to trigger in case of an accident. The controller can condition the bolt mechanism in the case of an accident by unlocking the bolt lock responsive to the driver not wearing a seat belt. Also, the first sensing device includes one of an electrical switch and optical switch juxtaposed with respect to seat guiding rails. The first sensing device can sense one of weight and height of the driver. Further, the second sensing device can include one of an electrical and optical buckle usage switch juxtaposed with respect to the seat belt buckle for the driver's seat belt.

In the scope of the invention a steering column for a motor vehicle is provided with adjustment means which can be triggered in the case of an accident to move at least a steering wheel end region of the steering column away from a passenger wherein the adjustment means include load absorbing means to absorb a movement of at least the steering wheel end region of the steering column away from a passenger.

Furthermore, according to the invention a steering column for a motor vehicle is provided with adjustment means which can be triggered in the case of an accident to move at least a steering wheel end region of the steering column away from a passenger wherein the adjustment means are designed for at least two operation modes and wherein a control is provided to sense passenger's parameters by means of detection means and to trigger an operation mode of the adjustment means in dependence on the passenger's parameters.

With each of the two embodiments different circumstances, as for example, a tall driver not wearing a seat belt, a tall driver wearing a seat belt, a small driver wearing a seat belt, etc., can be taken into consideration and in the case of an accident an optimum steering column adjustment can be performed in each case.

Furthermore, a steering column according to the invention preferably provides that the adjustment means include driving means to effect the movement of at least the steering wheel end region of the steering column away from a passenger, and that in the case of an accident the driving means can be triggered by the control in dependence on the passenger's parameters. A preferred further development is that the driving means include a pyrotechnic gas generator and/or can be triggered electrically.

According to another further development of the present invention useable with advantage it is provided with the steering column that the adjustment means include load absorbing means to absorb a movement of at least the steering wheel end region of the steering column away from a passenger and that in the case of an accident the load absorbing means can be directly or indirectly operated by the control in dependence on the passenger's parameters. This can preferably be further developed in the way that the load absorbing means include at least two stages which in the case of an accident can be directly or indirectly operated by the control in dependence on the passenger's parameters whereby the stages or steps of the load absorbing means can preferably be operated individually with particular in each case different load absorbing properties and/or simultaneously with the added load absorbing properties. Alternatively or additionally, it can be provided that the load absorbing means or, given the case, each step or stage thereof can be switched off directly or indirectly by the control in dependence on the passenger's parameters in the case of an accident. Further features that can be combined with these embodiments are that the load absorbing means or, given the case, one stage thereof includes deformation means, especially with chip-detaching cutting knifes and/or material deforming bolts and/or deceleration or braking means, especially a braking sled with preferably at least two braking force steps, along a movement way.

Preferably, the control is designed to sense the passenger's seat position, seat belt fastening status, size, weight and/or posture by means of the detection means.

In the present embodiment the control can be designed preferably to trigger the driving means in dependence with the passenger's seat position and especially to sense or detect a preselectable distance or an underrun of a preselectable distance of the position of the seat for the passenger to the steering wheel by means of the detection means. In the latter embodiment it is furthermore preferred if the control is designed to trigger such an operation mode of the adjustment means, in which in the case of an accident with a detected preselectable distance or a detected underrun of a preselectable distance of the position of the seat for the passenger to the steering wheel, the driving means of the adjustment means will be triggered. An advantageous further development thereof is that the control is designed to drive the load absorbing means or, given the case, each step thereof individually in dependence on the passenger's seat belt fastening status and/or seat position wherein the control can especially be designed to trigger such an operation mode of the adjustment means in which in the case of an accident with a passenger not wearing a seat belt the load absorbing means or at least one step thereof are/is effective. Alternatively or additionally, the control can be designed to trigger such an operation mode of the adjustment means in which in the case of an accident with a detected preselectable distance or a detected underrun of the preselectable distance of the position of the seat for the passenger to the steering wheel the load absorbing means or at least one step thereof are/is ineffective.

Furthermore, it is preferred that the detection means includes: a position detection means of the seat for the passenger; a status detection means of the seat belt buckle for the passenger's seat belt; a size, weight and/or posture detection means regarding to the passenger. Therewith the position detection means of the seat for the passenger can include, at least one electrical or optical switch within or in connection with seat guiding rails. The status detection means of the seat belt buckle for the passenger's seat belt can include at least one electrical or optical buckle usage switch.

The above mentioned object of the present invention is also achieved by an adjustment method for a steering column of a motor vehicle whereby in the case of an accident at least a steering wheel end region of the steering column is moved away from a passenger by means of adjustment means. According to the invention, with this method passenger's parameters are sensed by detection means and the movement at least of the steering wheel end region of the steering column is performed away from the passenger in dependence on the passenger's parameters according to one operation mode out of several operation modes of the adjustment means.

Preferably, therewith there is triggered a driving of the adjustment means to effect the movement of at least the steering wheel end region of the steering column away from a passenger in the case of an accident in dependence on the passenger's parameters, and/or there is absorbed a movement of at least the steering wheel end region of the steering column away from a passenger in the case of an accident in dependence on the passenger's parameters. According to a preferred further development of the latter method variant an absorbency of the movement of at least the steering wheel end region of the steering column away from a passenger in the case of an accident is selectively switched off in dependence on the passenger's parameters, especially in single steps.

In the method according to the invention it is also advantageously possible to sense the passenger's seat position, seat belt fastening status, size and/or posture as passenger's parameters. Therewith it is preferred that the adjustment means are driven in dependence on the seat position wherein especially the adjustment means are not driven in the case of an accident with a detected preselectable distance or a detected underrun of a preselectable distance of the position of the seat for the passenger to the steering wheel according to an operation mode. Alternatively or additionally, the adjustment means can be damped in dependence on the passenger's seat belt fastening status and/or seat position. In the latter procedure the adjustment means can also be completely or partially damped in the case of an accident with a passenger not wearing a seat belt, according to an operation mode and/or the adjustment means can be completely or partially damped in the case of an accident with a sensed or detected preselectable distance or a sensed or detected underrun of a preselectable distance of the position of the seat for the passenger to the steering wheel, according to an operation mode.

Further preferred and advantageous embodiments result from the combinations of the dependent claims as well as from the complete disclosure of the present document.

With the present invention a steering column, as well as, an adjustment method for a steering column according to prior applications mentioned at the beginning are thus further improved in an advantageous manner.

BRIEF DESCRIPTION OF THE DRAWINGS

The invention will be explained in more detail based on the embodiment and application examples subsequently described and illustrated in the drawings.

FIG. 3b depicts a sectional view of the left half of FIG. 3a.

FIG. 3c depicts a sectional view of the right half of FIG. 3a.

DETAILED DESCRIPTION OF PREFERRED EMBODIMENTS

Figure 1:
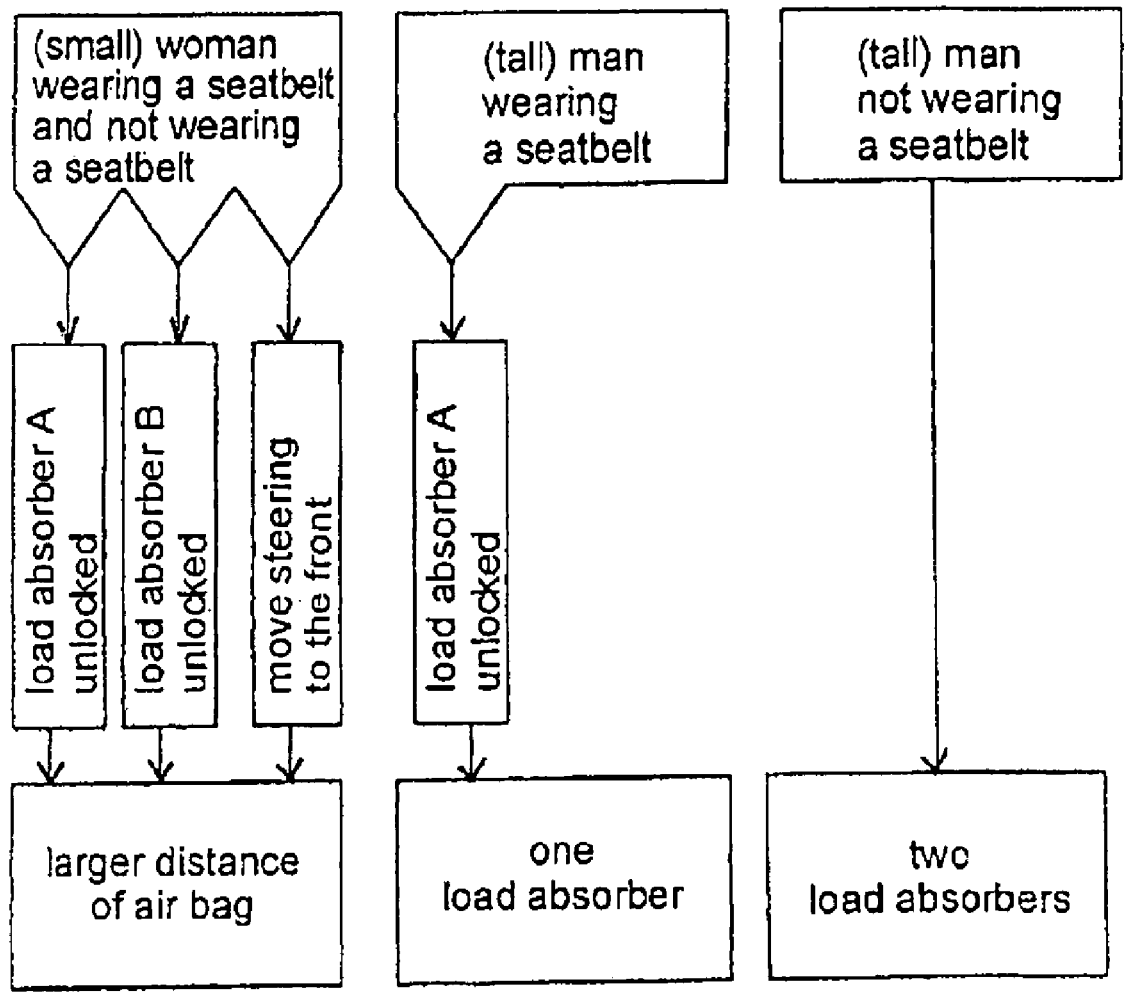
FIG. 1 schematically shows operation modes of adjustment means of a first embodiment example of a steering column, FIG. 2 schematically shows a circuit diagram and a structural diagram of the control of the first embodiment example of the steering column of FIG. 1, FIG. 3a schematically shows the adjustment means of the first embodiment example of the steering column of FIG. 1 in a view from below (left half of FIG. 3a) and from above (right half of FIG. 3a) and corresponding cross sections, respectively.

Identical reference symbols in the individual figures and illustrations of the drawings refer to equal or similar or equally or similarly effecting components. Based on the illustrations in the drawings also such features which do not have reference symbols, become evident independent on the fact if such features are subsequently described or not. On the other hand, also features which are included in the present description, but not visible or illustrated in the drawings are easily evident to the ordinary person skilled in the art.

With reference to the FIGS. 1, 2, 3a, 3b, 3c, 4 and 5, from which further details and data are can be taken, in the following further features, functions and advantages of the present invention will be explained in detail only by example based on a first embodiment example.

This embodiment example refers to an active safety steering column for the three most important uses in the case of an accident, as illustrated in the diagram of FIG. 1, which shows the structure and the operation modes for the corresponding steering column. In this first embodiment example three operation modes adjusted to the corresponding passenger's parameters are provided corresponding to three requirements in the case of an accident:

1. A larger air bag distance with small people by on the one hand actively moving the steering wheel end of the steering column following a front accident, for example, by a pyrotechnically driven cylinder, away from the passenger, prevents the risk of injuries of such small people by the air bag itself as they would otherwise be too close to the air bag inflating with force or impact by the abrupt inertia caused forward movement towards the steering wheel, and on the other hand load absorbers which are provided for the operation modes for tall people (see in the following point 2 and 3) are brought out of service or function;
2. load peak reduction in the case of tall people wearing a seat belt by not actively moving the steering column away from the passenger following a front accident (e.g., a pyrotechnically driven cylinder provided for an active retraction of the steering wheel end of the steering column is not triggered) and by simultaneously making sure that a load absorber A assigned for this application case is employed, which thereby ensures a corresponding energy absorption when the passenger is hitting the steering wheel, by that a movement of at least the steering wheel end of the steering column caused by the passenger's impact is decelerated with the load absorber; and
3. large load peak reduction in the case of tall people not wearing a seat belt by not actively moving the steering wheel end of the steering column away from the passenger following a front accident (e.g., a pyrotechnically driven cylinder provided for an active retraction of the steering wheel end of the steering column is not triggered) and by simultaneously making sure that two load absorbers A and B assigned for this application case are simultaneously and additively employed, which thereby ensure a corresponding energy absorption when the passenger is hitting the steering wheel, by that a movement of at least the steering wheel end of the steering column caused by the passenger's impact is decelerated with the load absorbers A and B.

Thus in the first embodiment example there is provided a twofold load restriction connected in parallel which in combination reduces the high load in the case of tall people not wearing a seat belt. In the case of heavy drivers not wearing a seat belt there is an essentially higher load absorbency necessary than practically used today. Safety steering columns known from today's practical use are mounted, for example, in a "carriage" (see FIGS. 1, 2, 3a, 3b, 3c and 4 as well as description thereof). This "carriage" moves against a deforming metal sheet when a constructively fixed load limit is exceeded whereby the high load peak in the case of heavy drivers is reduced with both load absorbers A and B according to the present invention.

In the case of tall drivers wearing a seat belt (detectable, e.g., by a switch in the seat belt buckle) one of the two load restrictions (e.g., load absorber A) is taken or brought out of service or function in a crash or accident. This is performed, for example, by unlocking the mount or attachment of one of the load restrictions by an electromagnet, a pyrotechnically unlockable bolt, or the like.

In the case of small drivers (detectable, e.g., by a switch in the seat rail for the purpose of position scan) both load absorbers A and B are unlocked and the carriage is pyrotechnically moved to gain the necessary distance to the exploding air bag. Thereby a special advantage of the present invention is achieved.

Of course, the tall driver's weight detection and, e.g., a small woman driver's position detection can also be detected by means of electronic weight and position sensors, which are being developed at many places, or by other suitable kinds easily known to or accessible for the ordinary person skilled in the art.

Figure 2:
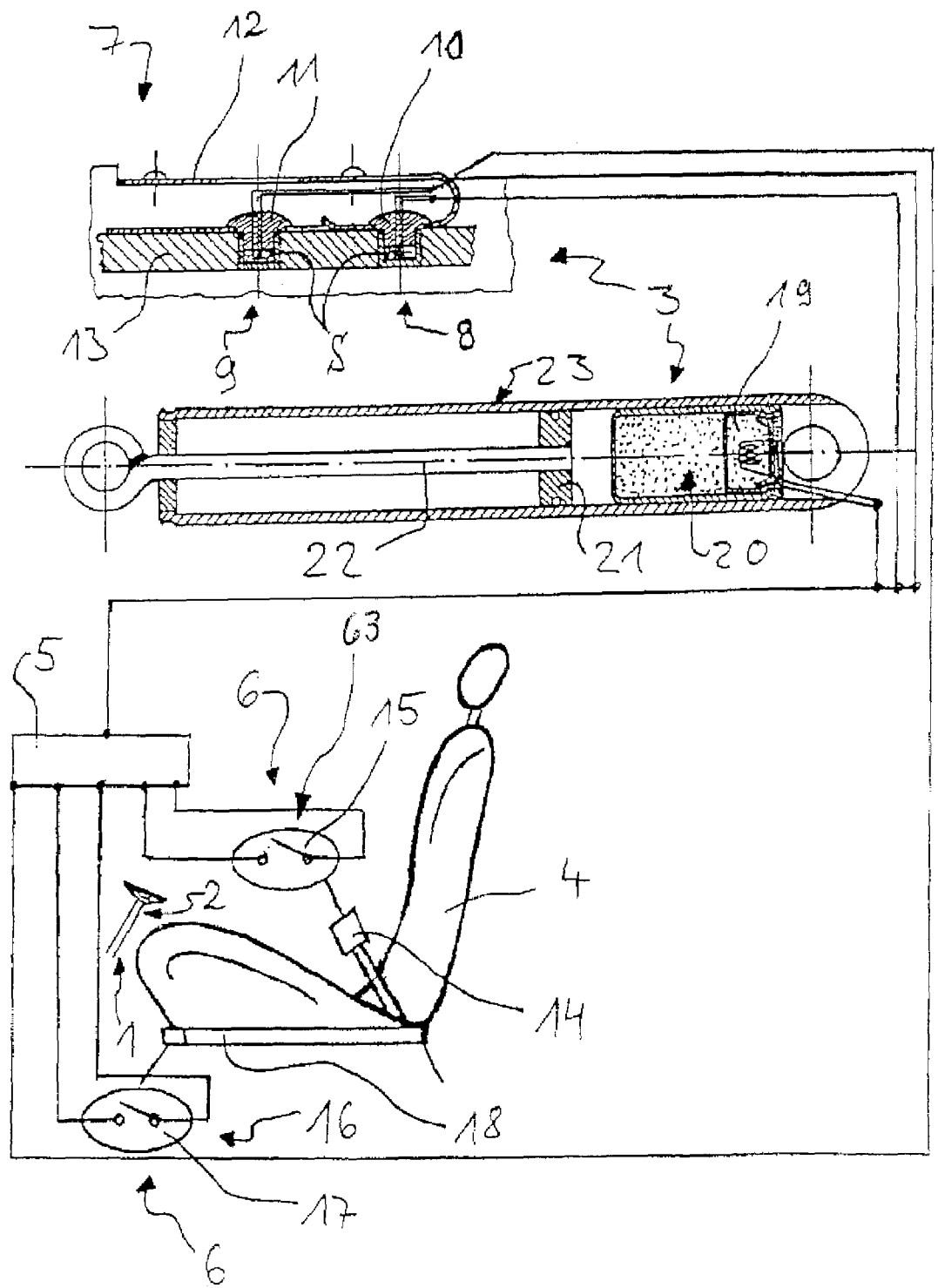

FIG. 2 schematically illustrates the circuit diagram of the first embodiment example.

A sketched steering column 1 for a motor vehicle (not shown) has a common telescopic structure. Such a steering column 1 is not herein described because such a steering column 1 is widely known in the art and assumes numerous embodiments. The present invention can be applied to all known designs including completely retractable non-telescoping pushable steering columns. The present invention does not refer to the actual design of such steering columns. The steering column 1 has a steering wheel end region 2 and is provided with adjustment means 3 which can be triggered in the case of an accident to move at least the steering wheel end region 2 of the steering column 1 away from a passenger (not shown) who is sitting on a seat 4. The adjustment means 3 are designed for the three operation modes illustrated in the FIG. A control 5 senses or detects passenger's parameters by means of detection means 6 and triggers an operation mode of the adjustment means 3 in dependence on the passenger's parameters.

The adjustment means 3 comprise load absorbing means 7 with a first and a second load absorber or restrictor 8 (A) or 9 (B) which each include an individual bolt 10 or 11 and a common load absorbing metal sheet 12 forming deformation means (D). By means of the bolts 10 and 11 the load absorbing metal sheet 12 is connected to a sled or carriage 13. The load absorbing metal sheet 12 is fixedly or permanently connected to a telescopic part (not shown) of the steering column 1 and the sled 13 is fixedly or permanently connected to another telescopic part (not shown) of the steering column 1. If the telescopic pan (not shown) of the steering column 1 including the steering wheel end region 2 is loaded or pressed by a passenger (not illustrated) hitting the steering wheel (not marked), so it will be pushed in or over the other telescopic part. This movement is absorbed or damped by the load absorbing means 7 as the load absorbing metal sheet 12 is deformed gppm itself and/or the load absorbin metal sheet is deformed against the bolts 10 and 11.

The bolts 10 and Ii have each an explosive charge S which can be electrically ignited each independently from each other by the control 5, which, for example, is connected to or integrated in a main or total control (not shown) for an air bag to make any of the bolts 10 and 11 correspondingly ineffective. Status detection means 63 of a seat belt buckle 14 are connected to the control 5 as detection means 6 in the form of a seat belt or buckle usage switch 15. This seat belt usage switch 15 results in a seat belt usage signal if the passenger has correctly fastcned his seat belt (not shown). If the seat belt usage signal is not generated, the control will be informed that the passenger has not correctly fastened his seat belt.

Furthermore, the detection means 6 comprise position identification means 16 which are formed by a position switch 17 in a seat rail 18 of the seat 4. This position switch 17 results in a close position signal if the seat 4 has reached the position of the position switch 17 or is closer than the position switch 17 to the steering column 1. Thereby the control 5 receives the information that the passenger is a small person. If the close position signal is not generated, the control will be informed about the fact that the passenger is a tall person.

By the possible combinations of seat belt usage signal and close position signal the control 5 can set each of the three operation modes of the adjustment means 3 according to FIG. 1.

If the control 5 has received the close position signal, so it will take care for the operation mode for a "small woman" wearing or not wearing a seat belt. In this mode, the control 5 ignites the explosive charges S of the two bolts 10 and 11 so that they become ineffective and the load absorbing metal sheet 12 and the carriage or sled 13 are decoupled. Furthermore, the control 5 ignites a pyrotechnic explosive charge 19 of a gas generator 20, and the gas generated therewith acts on a piston 21 with a piston rod 22 which is fixedly attached to the telescopic part (not illustrated) of the steering column 1 comprising the steering wheel end region 2, in such a way that the two telescopic parts (not illustrated) of the steering column 5 are contracted. The parts 19 to 22 are components of the adjustment means 3 and together form driving means 23. By the contracting or retracting of the steering column 1 more free space is generated for the "small woman" who is sitting relatively close to the steering wheel (not marked) so that she is not hit or at least seriously hit by an air bag (not illustrated) inflating in the case of an accident.

If the control 5 has not received the close position signal, it checks if the seat belt usage signal is supplied. If the seat belt usage signal is given the control 5 initiates the operation mode for a "tall man" wearing a seat belt. In this mode the control 5 ignites the explosive charge S only of the bolt 11 so that only this one becomes ineffective and the load absorbing metal sheet 12 and the carriage 13 are only coupled by the bolt 10. The load absorber 8 (A) therewith is effective to reduce energy occurring upon the impact of the "tall man" wearing a seat belt, on the steering wheel (not marked). The driving means 23 are not triggered.

If the control 5 receives neither the close position signal nor the seat belt usage signal, so the control 5 causes the operation mode for a "tall man" not wearing a seat belt. In this mode the control 5 ignites no explosive charge S so that the load absorbing sheet 12 and the carriage 13 are coupled by the two bolts 10 and 11. The load absorber 8 (A) and the load absorber 9 (B) therewith are effective to reduce the energy occurring upon the impact of the "tall man" not wearing a seat belt, on the steering wheel (not marked). The driving means 23 are not triggered.

Signal lines between the control 5 and the explosive charge S, the pyrotechnic explosive charge 19 as well as the detection means 6 are drawn as lines or dashes in FIG. 2.

Figure 3B:
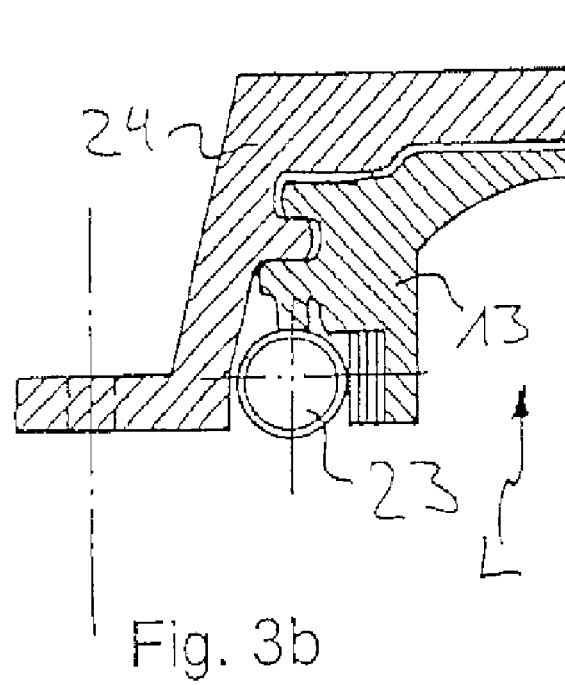
Figure 3C:
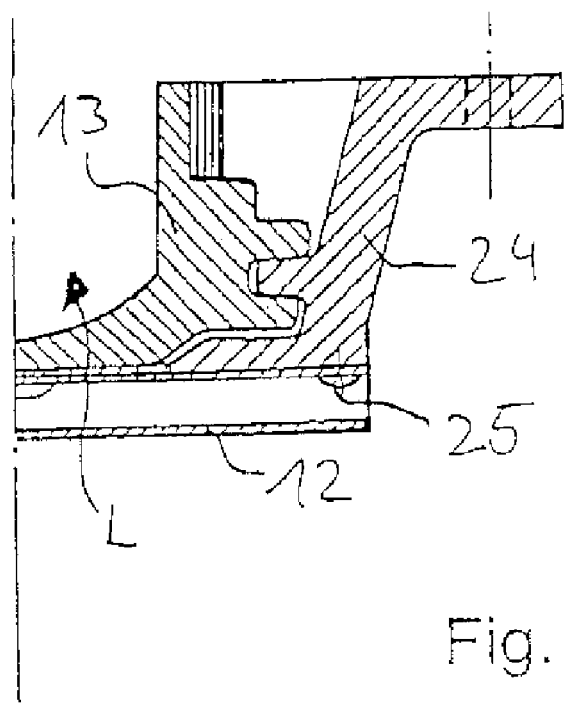

FIGS. 3*a*, 3*b* and 3*c* show a carriage or sled 13 for mounting the steering column (not shown) in its carriage mount 24 in FIG. 3*a* from below on the left hand side and from above on the right hand side and in FIGS. 3*b* and 3*c* sectioned correspondingly. The pyrotechnic gas generator 20 of the driving means 23 is fixed on the one hand to the carriage mount 24 and on the other hand to the carriage 13.

On the right hand side of FIG. 3*a* the load absorber 8 (A) and the load absorber 9 (B) are individually shown in mounting position. The load absorbers 8 and 9 are provided with the bolts 10 or 11 on the carriage 13 on the one hand and on the other band on the carriage mount 24 with screws 25. The slidable telescopic part (not shown) of the steering column 1 is fixedly mounted in the recess L.

Figure 4:
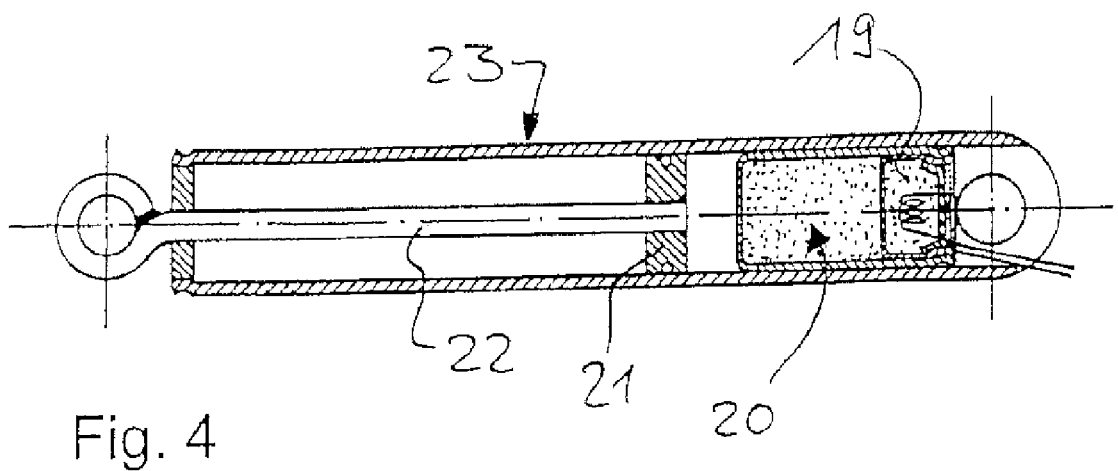
FIG. 4 schematically shows the driving means of the first embodiment example of the steering column of FIG. 1, FIG. 5 schematically shows the load absorbing means of the first embodiment example of the steering column of FIG. 1, FIGS. 6 to 8 schematically show in a cross section a second embodiment example of a steering column before a triggering, after a triggering in the case of a small passenger and after a triggering in the case of a tall one, respectively, FIG. 9 schematically skew shows the adjustment means of a third embodiment example of the steering column in a partially sectioned plan view and two cross sections, respectively.

The driving means 23 are separately shown in FIG. 4, as they have already been explained in connection with FIG. 2.

Figure 5:
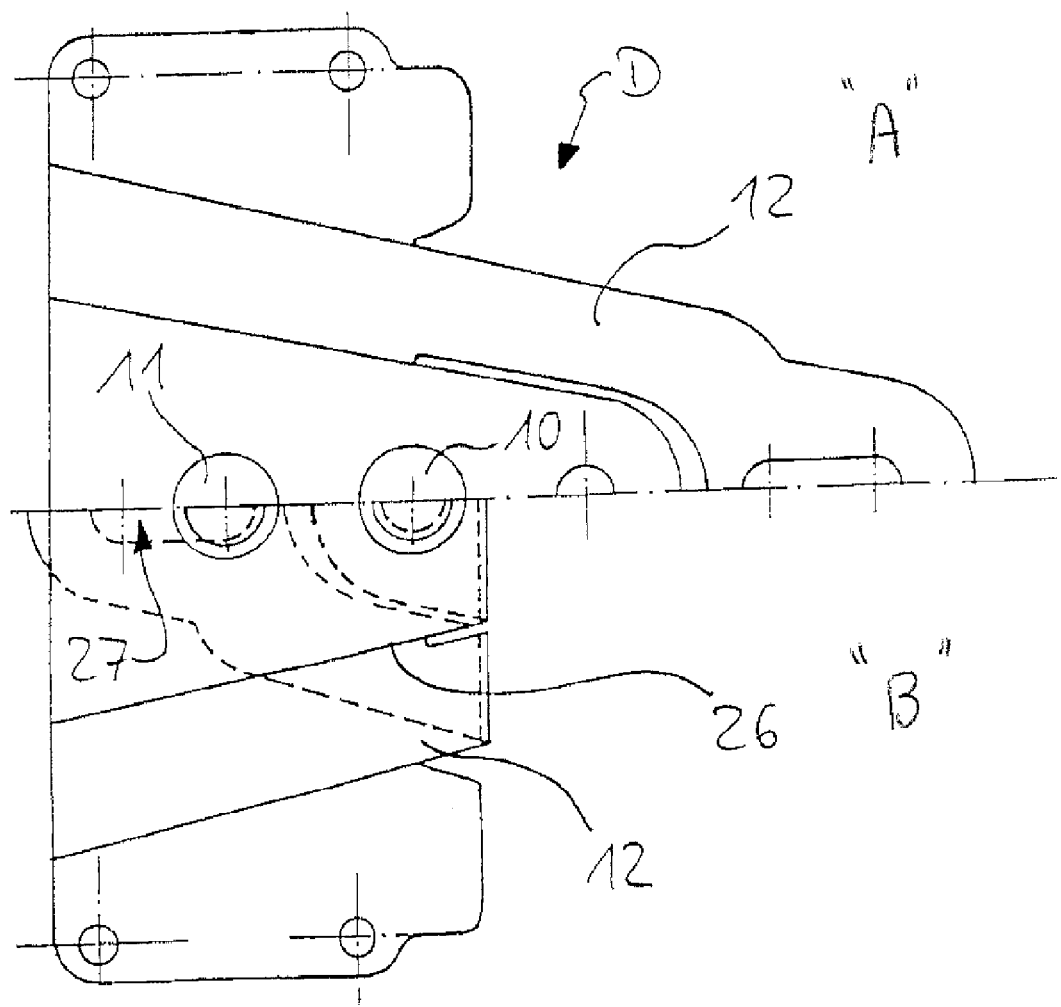

FIG. 5 shows the load absorbing metal sheet 12 which is a stamping., A first section "A" of FIG. 5 depicts the metal sheet 12 in a condition ready for mounting. A second section "B" of FIG. 5 depicts the metal sheet 12 in a condition after an actuation of both load absorbers 8 and 9.

An inventive further development lies in the designing of the pistonsl with a reverse lock. In the load cases mentioned above, at first the steering column is shot to the front, and the load absorbers are unlocked and are in an unutilized state leave over a part of their lengths. In the final phase of an accident, the pointed front wall or dash panel can move backward in the direction of the steering column tending to force the steering column to the back. When the pistons are provided with a reverse lock, movement of the steering column to the back is prevented. In this case the load absorbers are crushed or bent away outside of the sled casing.

As an additional special feature of the invention the load restrictor S (A) is designed in such a way that it tears at tearing seams 26 by means of the bolt 10 immediately upon a load excess. Therewith the end of the load restrictor 8 (A) necessarily shifts or moves over the load restrietor 9 (B) the bolt 11 of which moves in a slot 27 of the load restrictor 9 (B) at the moment. This design leads in an advantageous way to the fact that the tearing forces of both load absorbers 8 (A) and 9 (B) are added. If they tore in parallel side by side, only one of the both load absorbers A or B would work.

By the invention according to the first embodiment example there is especially provided a safety steering column with a crash carriage, which has two load absorbers, for tall and small people wearing or not wearing a seat belt. According to a preferred further development of this embodiment a control by a seat belt buckle usage switch is made. In a further development of the invention the crash carriage for the small people is used as "distance carriage" and its load absorbers are taken out of service. A detection of small people can preferably take place via an electric seat position detection.

It is especially preferred according to the present invention if the load absorbers are constructed running behind each other in such a way, e.g., by means of a slot in a connection, for a delayed start that the load absorbers add themselves by the load.

Just for the sake of completeness it is pointed out that the two telescopic parts, as e.g., pipes put inside each other, of the steering column 1 are fixed in the ordinary operation on the one hand side so that they cannot easily be telescoped but that on the other hand this fixation is so weak (e.g., plastics bolts) that firstly thereby no noticeable load absorbency for a tall driver (not wearing a seat belt) can be achieved and secondly the retraction of the steering column by the driving means in the case of a small driver (wearing a seat belt) is not noticeably influenced. This refers to the already explained embodiment example as well as to the second embodiment example explained in the following.

Figure 6:
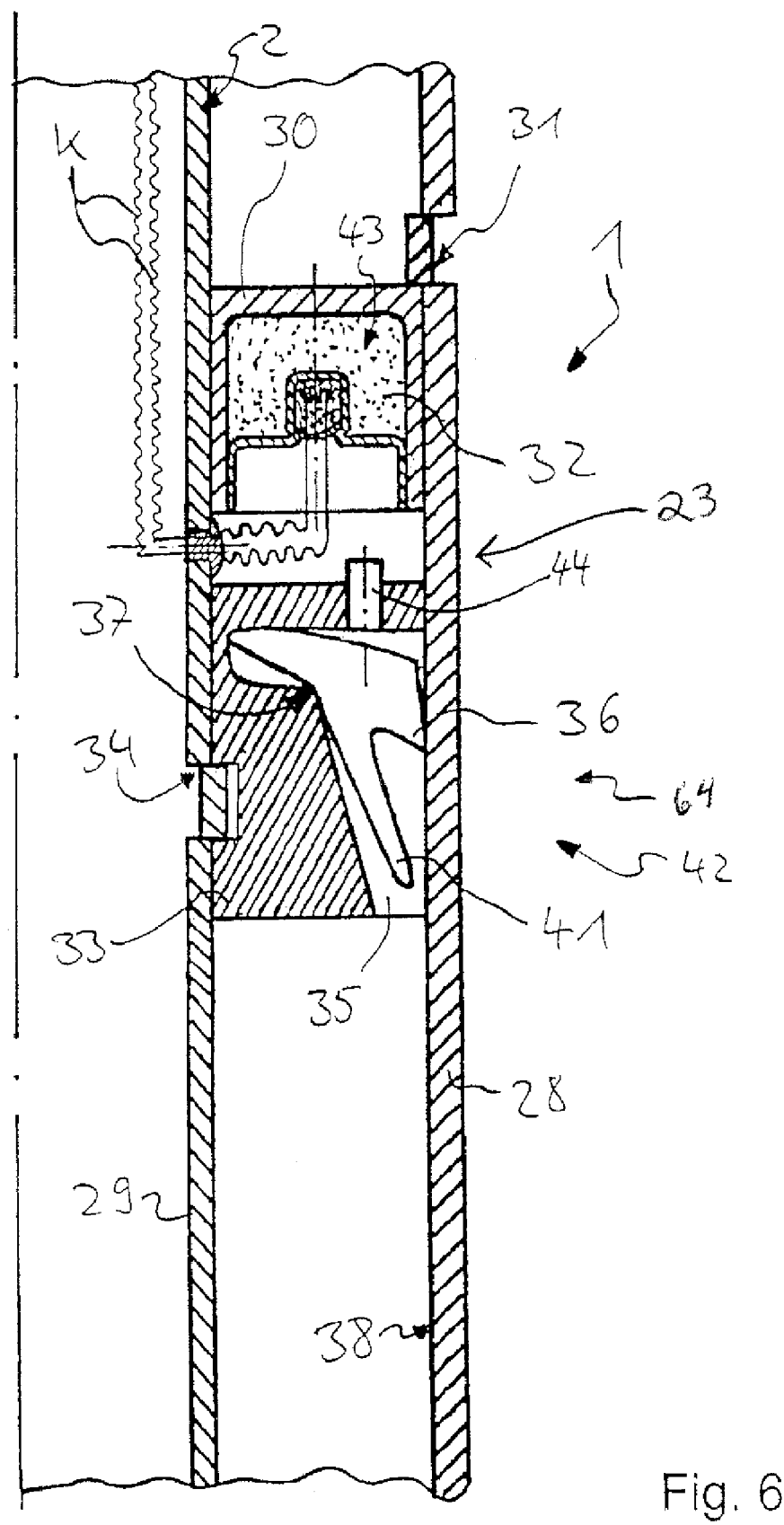
Figure 7:
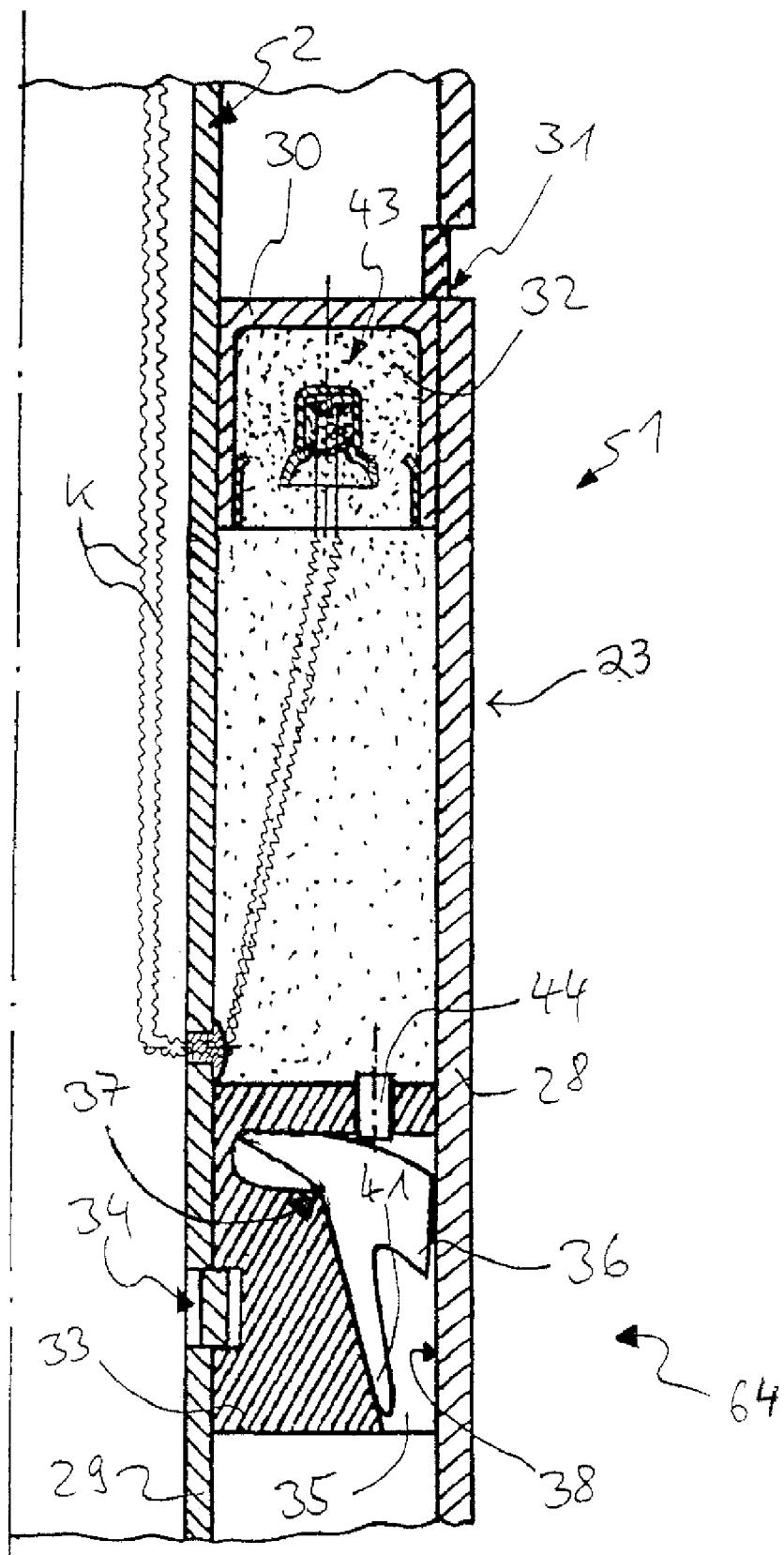
Figure 8:
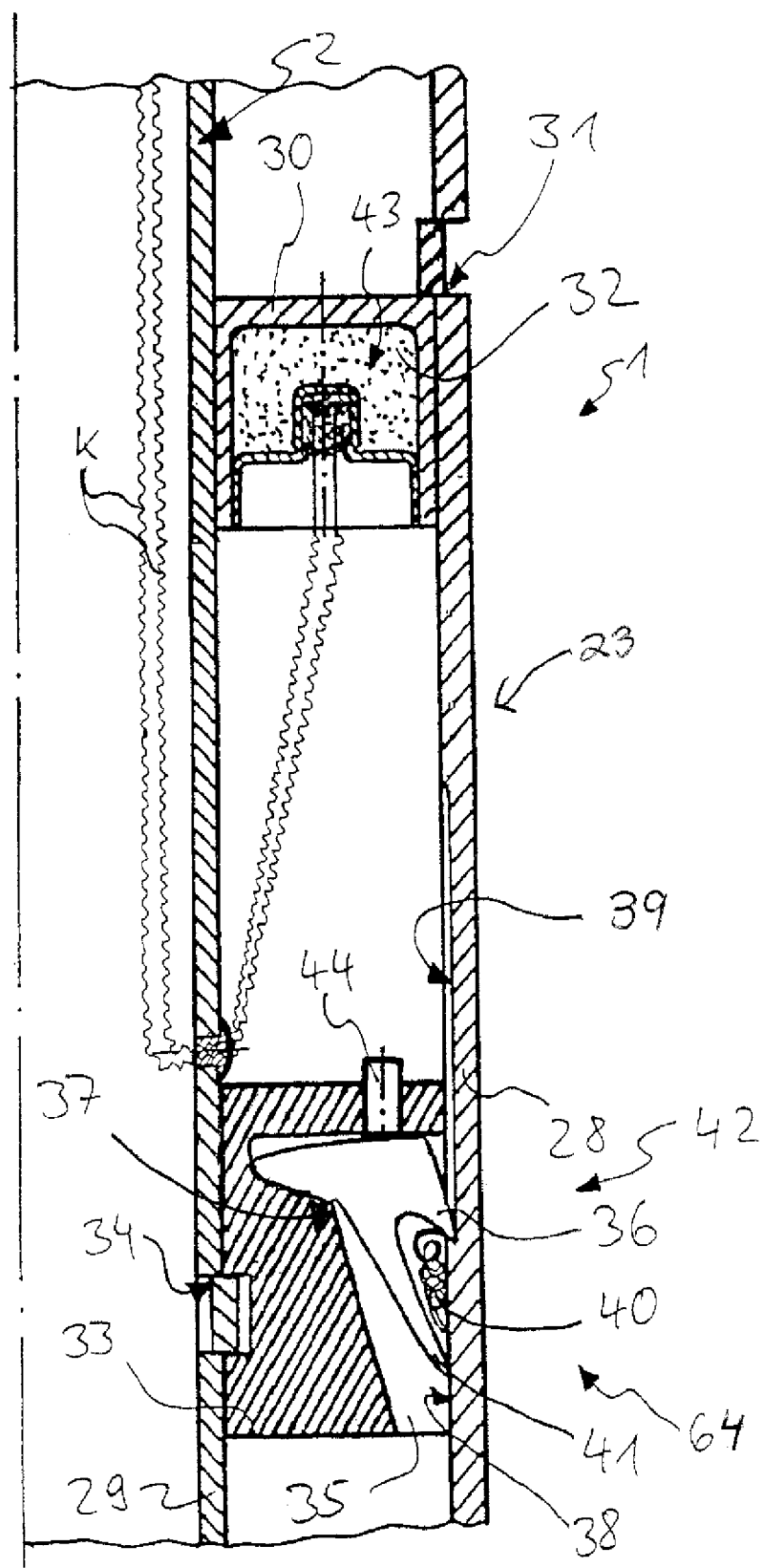

With reference to FIGS. 6 to 8, from which further details and data can be derived, further features, functions and advantages of the present invention based on a second embodiment example will be explained in more detail merely by example. In particular this embodiment example refers to a safety steering column with a pyrotechnically driven shortening in the case of small drivers and load peak absorption in the case of tall drivers. Current steering columns are partially equipped with a load peak absorption for heavy people as supplement to an air bag. Furthermore, practice has shown that small drivers sitting to close to the air bag have died because of it. The second embodiment example also provides a solution to the load peak absorption in the case of tall drivers and in the same system a steering column shortening in the case of small drivers, in an accident.

FIGS. 6 to 8 show a steering column outer pipe 28 and a steering column inner pipe 29 which make up the telescopic pans of the steering column 1 wherein the steering column inner pipe 29 includes the steering wheel end region 2 of the steering column 1. An outer pipe ring piston 30 is mounted to the steering column outer pipe 28, for example by a clinching connection 31. The outer pipe ring piston 30 includes a pyrotechnic cartridge 32 which is connected to the control 5 (compare FIG. 2) via control cables K. An inner pipe ring piston 33 is also fixedly or permanently connected to the steering column inner pipe 29 by a clinching connection 34. In the second embodiment example, this inner pipe ring piston 33 includes one or more correspondingly formed cutting knifes 36 mounted in slots 35 as part of the deformation means 64. The cutters or cutting knifes 36 are mounted on a "tilt or break over point" 37 in such a way that they cut well-aimed into the wall 38 of the steering column outer pipe 28 of the steering column 1 upon drive via the inner pipe ring piston 33. The cutting depth 39 of the chip 40 is defined by a correspondingly formed stop 41 The size of the chip 40 is proportional to the desired load absorbency. The deformation means 64 form load absorbencies 42.

The outer pipe ring piston 30 and the inner pipe ring piston 33 form driving means 23 which are components of the adjustment means 3 of the steering column 1, just like the load absorbencies 42.

FIG. 8 shows a corresponding load absorbency 44 42 in operation.

FIG. 7 shows the function with small drivers. Herein the charge 43 of the pyrotechnic cartridge 32 presses the inner pipe ring piston 33 connected with the steering column inner pipe 29 downwards and therewith away from a passenger (not shown). At the same time a control pin 44 treated with the pressure prevents the cutter 36 from inclining to the position "load absorbency", i.e., to the chip-detaching or machining in the wall 38 of the steering column outer pipe 28 of the steering column 1.

In summary, the embodiment example of the present invention illustrated in FIGS. 6 to 8 can be explained as follows: Steering column pipes that can be telescoped are provided with "ring pistons" which shorten the steering column by means of a pyrotechnic pressure set-up or building in between in the case of small drivers and therewith bring an inflating air bag to a largerdistance. In one of the ring pistons a load absorbing mechanism is integrated which becomes effective in the case of tall drivers instead of the steering column shortening and is taken out of service by means of pyrotechnic pressure in the case of small drivers. The second ring piston is provided with a load absorbing mechanism. The shown example deals with correspondingly formed and mounted inclineable cutters or knifes. Herein corrugated tubes, material deforming balls or the like (not shown in the figures) may be also used. Basically, the function of the load absorbing ring piston is in such a way that the piston automatically absorbs or reduces load if the inner steering column pipe is moved relatively to the outer one. In the shown case, the cutter is machiningly or chip-detachingly pressed in the outer steering column pipe. Alternatively, this load absorbency can be "skipped" in the case of a pyrotechnic ignition with corresponding power or the "cutter" is inclined out of service by a pressure influenced pin 44 as shown in the FIG. 7.

In the steering column of a motor vehicle the inner and outer steering column pipe is designed, for example, with a difference in diameter as large as possible. As it is common today amongst other things, the outer steering column pipe is positioned in bearings (not shown in the figures). The inner steering column pipe is connected to the outer one form-fittingly via e.g. grooves with corresponding ring pistons. The ring piston pair is connected, for example, by clinching with an outer and an inner pipe each. A ring piston includes a pyrotechnic charge the pressure of which pushes the ring pistons away from each other and therewith shortens the steering column or is able to pull the steering wheel in driving direction to the front away from the passenger.

Small drivers can also be determined in the second embodiment example, e.g., by corresponding electronic monitoring systems or a seat position detection by means of switches in the seat rail.

Figure 9:
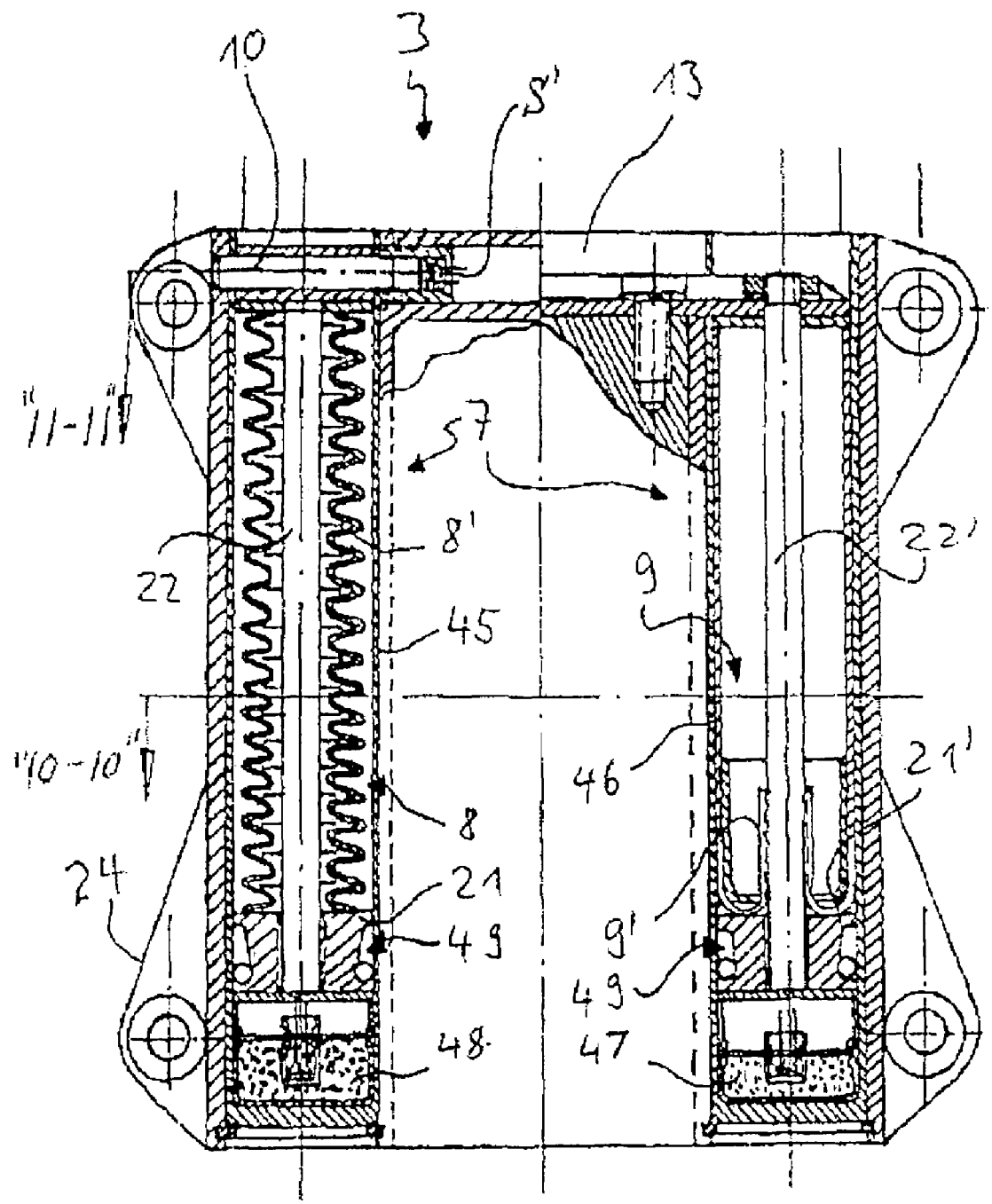
Figure 10:
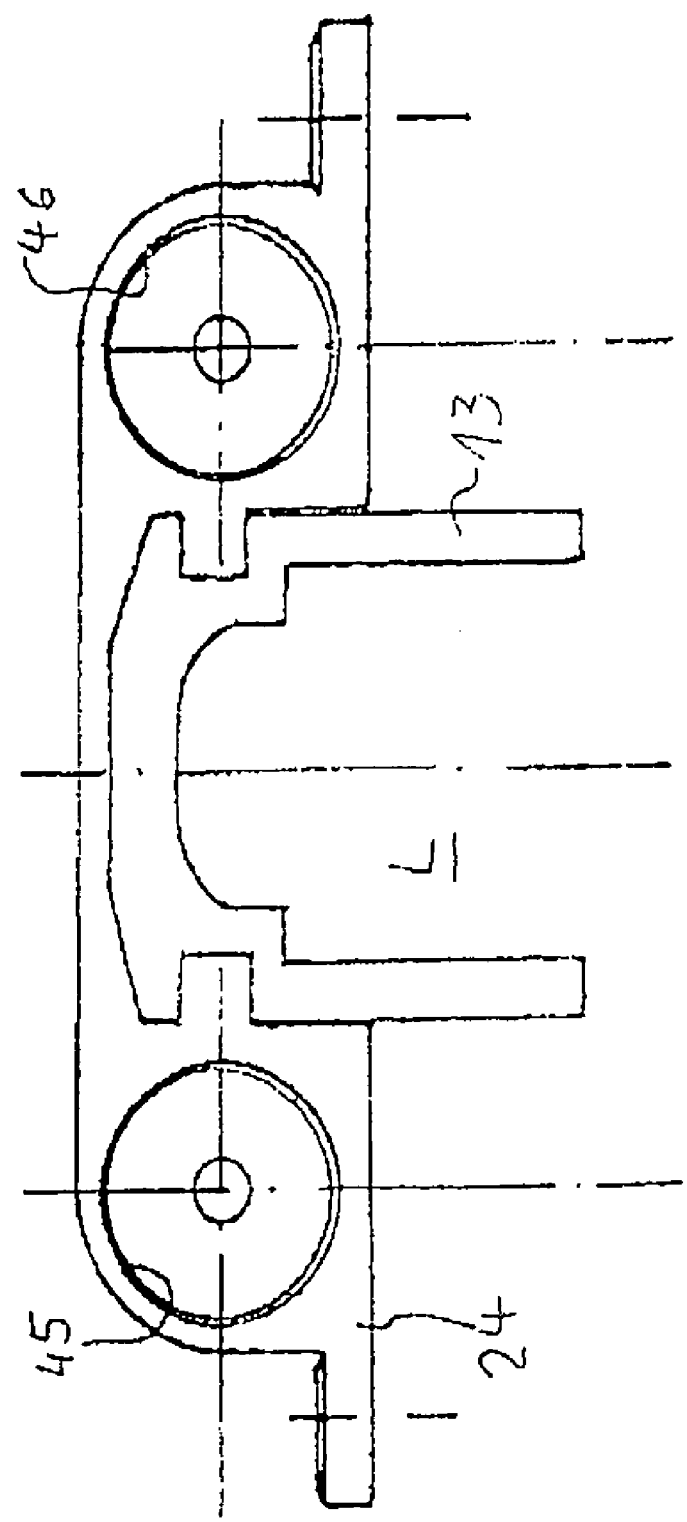
FIG. 10 depicts section "10-10" of FIG. 9.
Figure 11:
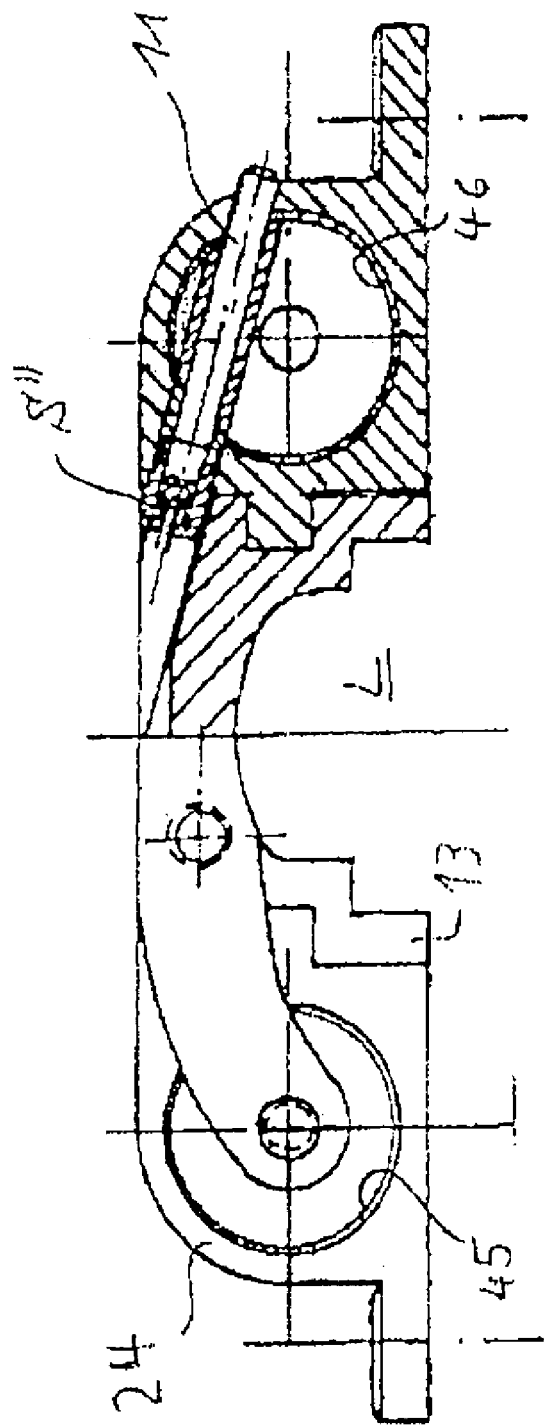
FIG. 11 depicts section "11-11" of FIG. 9.

With reference to FIGS. 9, 10 and 11 in the following further features, functions and advantages of the present invention will be explained in more detail merely by examples based on a third embodiment example. In the scope of this embodiment example the invention creates a safety steering column for 7 types of load in the case of an accident.

This safety steering column is also mounted in a sled or carriage movable in the case of a crash. Such a "sled" moves in the case of an excess of a constructively set load limit, e.g., against a deforming metal sheet. Therewith the load peak is reduced in the case of heavy drivers.

However, essentially more critical "load cases" can be taken into consideration than in the embodiment examples explained above, in which it makes sense to pull the steering column away or employ different load absorbing amounts, respectively.

In the scope of the embodiment example according to FIGS. 9, 10, and 11, the invention provides such a sled or carriage which is equipped with two special especially differently strong driving cylinders arranged in parallel. Each cylinder is equipped with different pyrotechnic cartridges ignitable by a control apparatus for the active movement. Upon ignition its exploding charge puts pressure onto the corresponding piston thereof and abruptly moves the steering column sled or carriage with the steering column fixed thereto to the front.

Before, however, the sled is able to move, the two load absorbing elements also included in the cylinders have to be "unlocked" at their support, i.e., one unlocking bolt each is removed from its locking position, for example, by a pyrotechnic charge each.

As there are differently strong pyrotechnic charges in both cylinders, three differently strong movements of the steering column downwards result therefrom in the embodiment example according to FIGS. 9, 10 and 11. Both charges in parallel make, e. g., sense for a small 5% woman (i.e., that only about 5% of all woman are smaller) not wearing a seat belt to gain a large distance to the exploding air bag as fast as possible because of the risk of death in the case of a too close air bag. A larger one of the two charges possibly makes sense for a small woman wearing a seat belt. The "closer" air bag has a belier protective effect. The single small charge possibly makes sense for the 50% man (i.e., an average tall man; about 50% of all men are taller and about 50% of all men are smaller) not wearing a seat belt.

The next possibility is to ignite no pyrotechnic charge and to unlock the two load absorbers. Therewith the steering becomes movable by the impact of the body without acting with load absorbers. This could also make sense for a 50% man not wearing a seat belt.

If the larger load absorber is unlocked and only the smaller one is made to act, this will possibly make sense for a medium tall 50% man wearing a seat belt. Furthermore, the bigger load absorber alone seems to make sense for a tall 95% man (i.e., 95% of all men are smaller or differently spoken, only 5% of all men are taller) wearing a scat belt.

Both load absorbers in parallel are to reduce the load peaks for a 95% man who does not wear a seat belt.

If the passengers and especially the driver are/is wearing a seat belt or not, can be detected, for example, by means of switches in the seat belt buckle. How tall and how heavy the passengers and especially the driver are/is, can be determined, for example, by "seat occupation mats", weight sensors or ultraviolet or infrared detection or by another suitable known or novel manner. A further simple version of detection according to the invention are switches or an electric potentiometer in the seat rail for position detecting the people. Small people usually sit further at the front, tall people further at the back.

The above mentioned suggestions serve as basic values. More precise facts can be easily determined by trials without further inventive merit.

In FIG. 9, e.g., different load absorbers 8 (A) and 9 (B) are shown, one as corrugated pipe 8' (load absorber 8) and another one as "turned-up pipe" 9' (load absorber 9) to provide different load absorbing characteristics as the need arises. The corrugated pipe 8' has higher load absorbing or reducing capacities than the turned-up pipe 9'.

An inventive further development lies in the designing of the pistonsl with a reverse lock. In the load cases mentioned above, at first the steering column is shot to the front, and the load absorbers are unlocked and are in an unutilized state leave over a part of their lengths. In the final phase of an accident, the pointed front wall or dash panel can move backward in the direction of the steering column tending to force the steering column to the back. When the pistons are provided with a reverse lock, movement of the steering column to the back is prevented. In this case the load absorbers are crushed or bent away outside of the sled casing.

The example of adjustment means 3 illustrated in FIGS. 9, 10 and 11 shows a sled or carriage 13, two cylinders 45 and 46 with corresponding two pyrotechnic driving charges 47 and 48, respectively, and the two load absorbers 8 (A) and 9 (B), respectively, as load absorbing means 7. It goes without saying that the illustration also applies to one or more than two cylinders, charges and/or load restrictors.

The sled or carriage 13 in FIGS. 9 to 11 is coupled to a telescopic steering column (not shown) in such a way that its shifting results in a contraction of the telescopic parts of the steering column. The shifting of the sled or carriage 13 can be actively operated either by triggering at least one of the two pyrotechnic driving charges 47 and 48 wherein then each of the corresponding bolts 10 and/or 11 is suitably unlocked, for example, by charges S' or 5" or by an external force action of a person (not shown) hitting the associated steering wheel wherein then the bolts 10' and/or 11 as described above are unlocked in such a way that one or both of the load absorbers 8 (A) and 9 (B) act which are differently designed.

The pyrotechnic driving charges 47 and 48 have different strengths so that three different driving versions of the sled or carriage 13 of the adjustment means 3 can be operated by the control 5:

1. lesser driving of the sled 13 by triggering only the small charge strength pyrotechnic driving charge or cartridge 47,
2. medium driving of the sled 13 by triggering only the larger charge strength pyrotechnic driving charge or cartridge 48, and
3. higher driving of the sled 13 by triggering both pyrotechnic driving charges or cartridges 47 and 48.

By selected triggering of one or both of the charges S' or S" to unlock the respectively corresponding bolt 10 or 11, different delays of the sled 13 of the adjustment means 3 can be verified by means of the load absorbing means 7 wherein none of the driving charges 47 and 48 is ignited or generally triggered:

1. no delay of the sled 13 by triggering both charges S' and S" so that none of the load absorbers 8 (A) and 9 (B) acts,
2. minor delay of the sled 13 by triggering only the charge S' so that only the less delaying load absorber 9 (B) acts,
3. medium delay of the sled 13 by triggering only the charge S" so that only the heavier delaying load absorber 8 (A) acts, and
4. higher delay of the sled 13 by triggering none of the charges S' and S" so that both of the load absorbers 8 (A) and 9 (B) act.

By combination of triggering at least of one of the two pyrotechnic driving charges or cartridges 47 and 48 with locked load absorbers 8 (A) and 9 (B), further fine tuning of the adjustment means 3 can be achieved without much further efforts.

For shifting the sled or carriage 13 the ignited driving charges or cartridges 47 and 48 act on pistons 21 and 21', respectively, with one piston rod 22 and 22', respectively, each on a retractable telescopic part (not shown) of the telescopic steering column (not shown). In order to prevent a movement of the telescopic steering column (not shown) completely or partially back into the passenger area (not shown) of a correspondingly equipped vehicle after such a shift of the sled or carriage 13, the pistons 21 and 21', respectively, are equipped each with a reverse lock 49. As a movement of the pistons 21 and 21', respectively, is also performed in the case of a shift of the sled or carriage 13 by an external force action of a person hitting the associated steering wheel (not shown), the reverse locks 49 also act in each of these cases.

Furthermore, in FIG. 9 section lines "10-10" and "11-11" are drawn along of which FIGS. 10 and 11, respectively, are to be understood. In FIGS. 10 and 11 the sled or carriage 13 itself and the sled support 24 are well visible which can be shifted against each other and one part of which is fixedly connected with a relatively to the vehicle fixed telescopic part (not shown) of the telescopic steering column (not shown) and the other part of which is fixedly connected with a shiftable telescopic part (not shown) of the telescopic steering column (not shown). The relatively to the vehicle fixed telescopic part (not shown) of the telescopic steering wheel (not shown) is fixedly mounted in the recess L.

Figure 12:
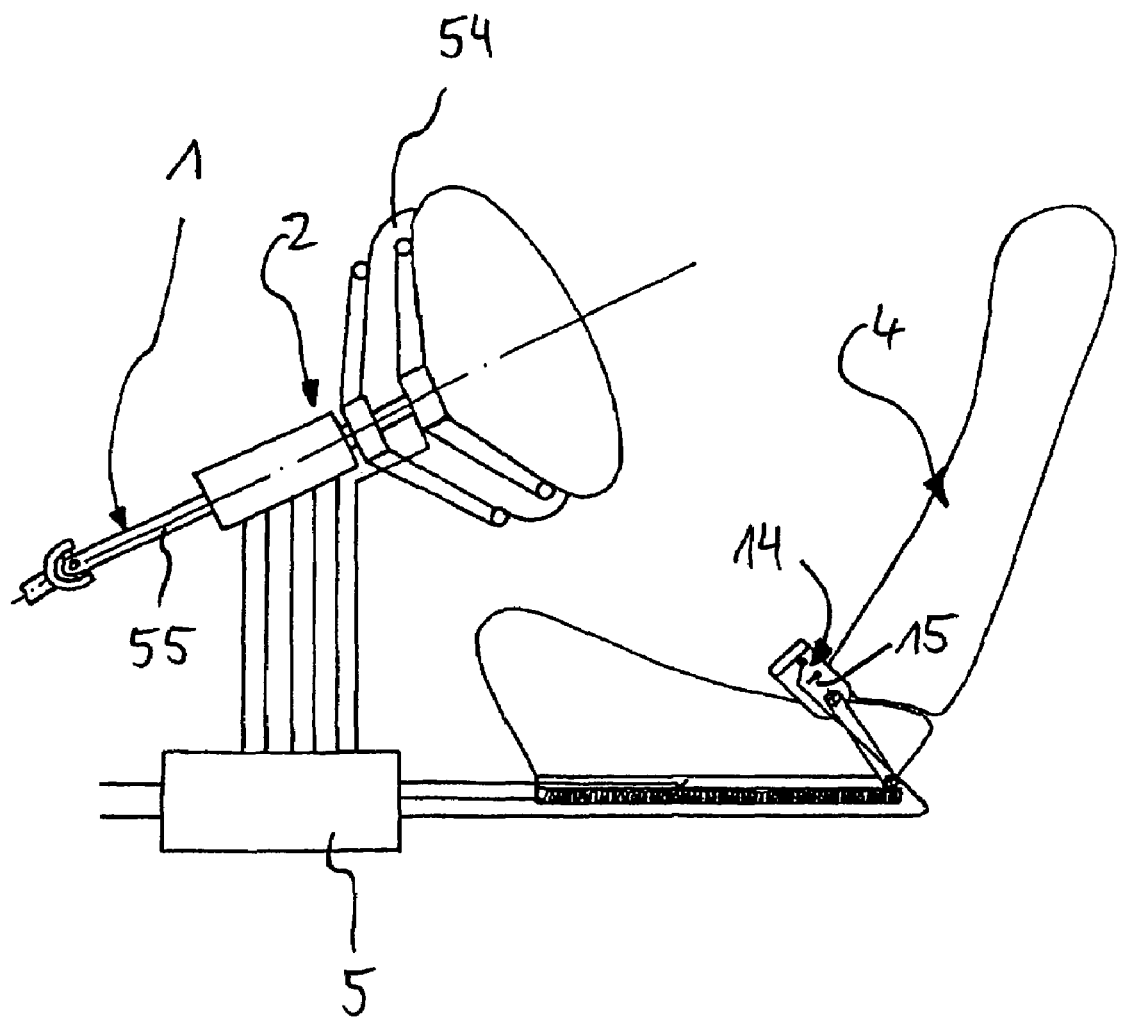
FIG. 12 schematically shows different positions of the third embodiment example in dependence of the effect of adjustment means, FIGS. 13 and 14 schematically explain the position of the carriage of the adjustment means for both positions of the steering column in FIG. 12.
Figure 13:
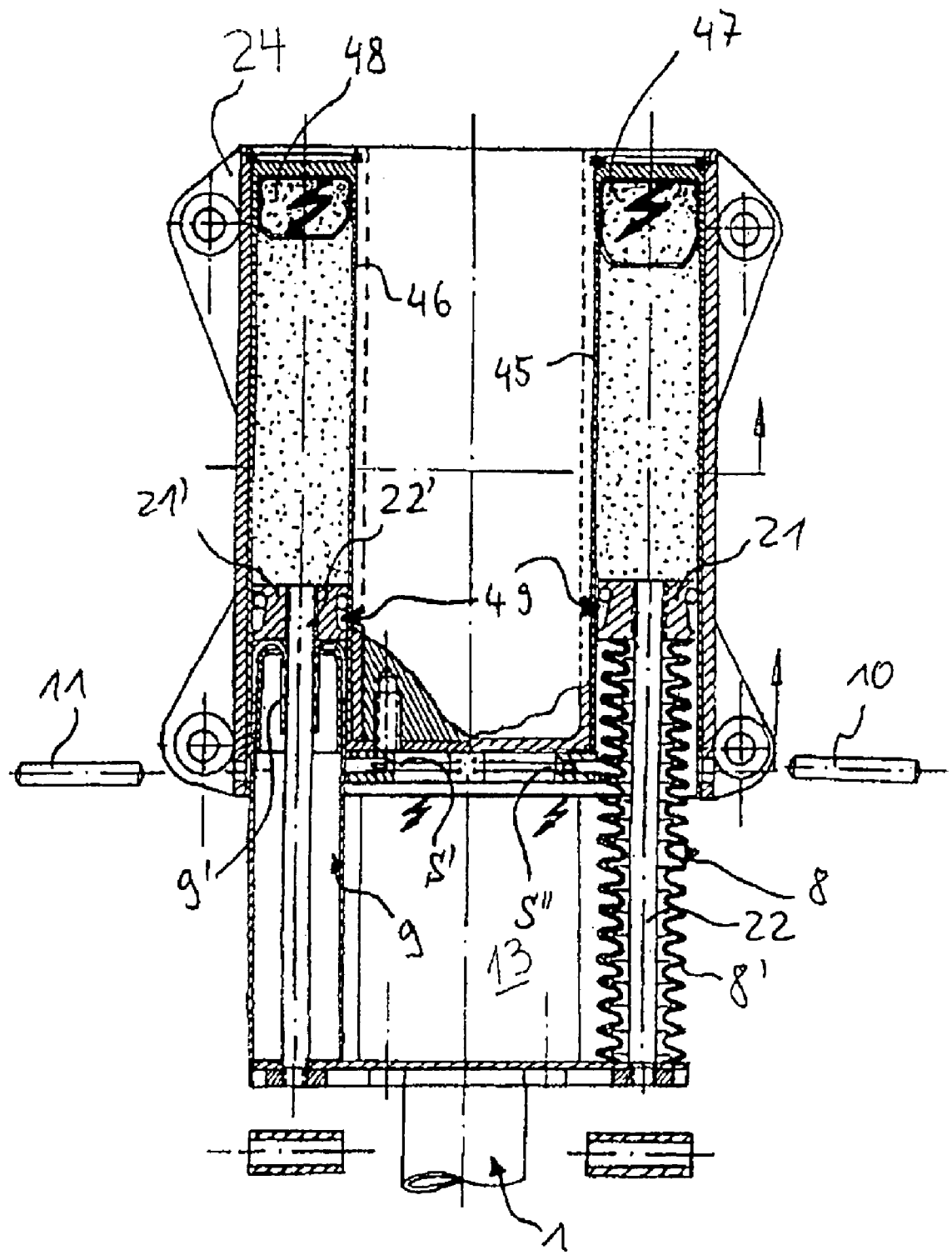
Figure 14:
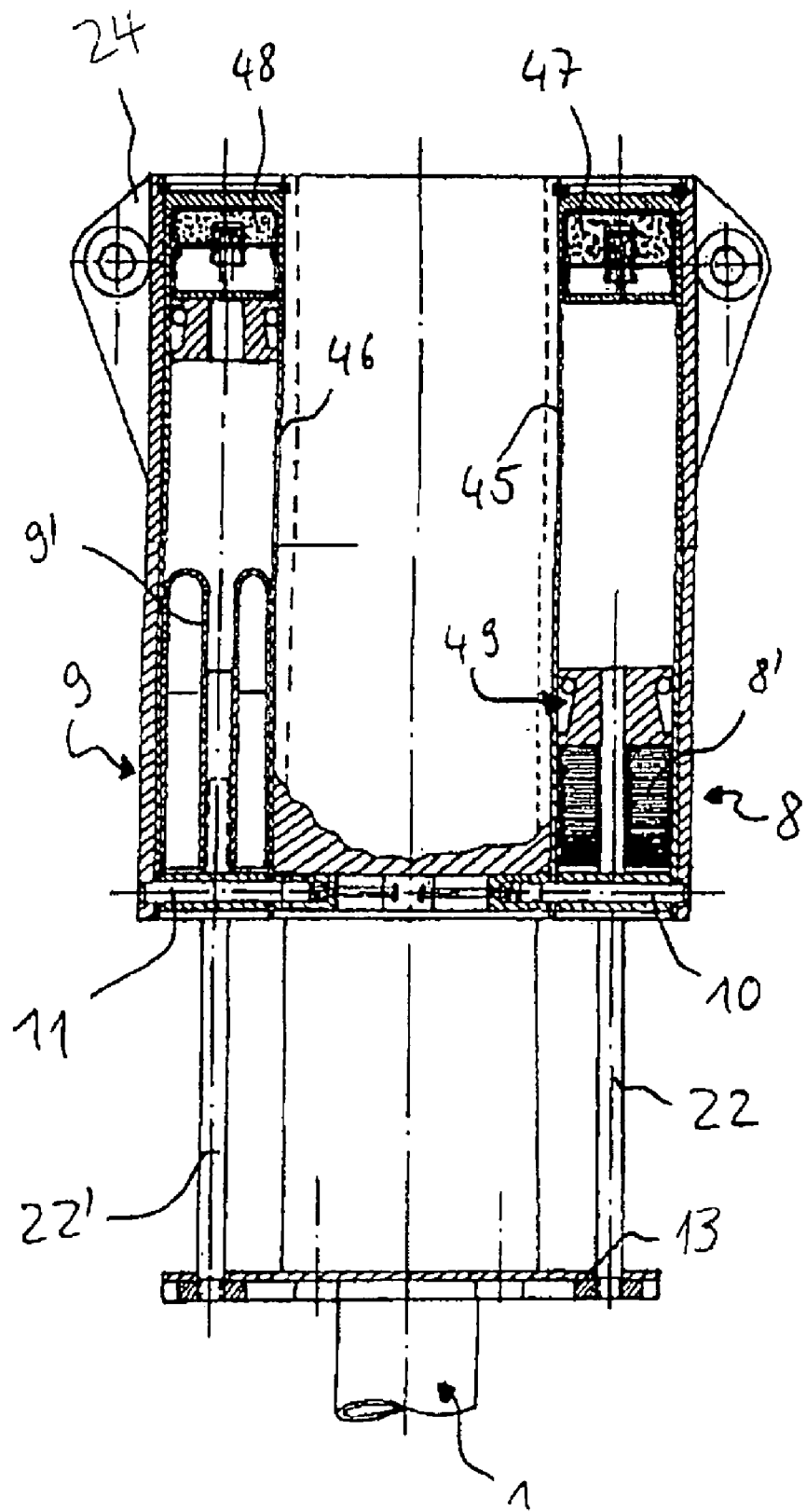

In FIG. 12 the steering column 1 with a steering wheel 54 on its steering wheel end region 2 as well as the seat 4 and the control 5 are shown. The steering wheel 54 and correspondingly that telescopic part (not marked) which forms the steering wheel end region 2 and which can be shifted against the other lower telescopic part 55 of the telescopic steering column 1 is drawn in two positions which correspond to the operation modes which are illustrated in FIGS. 13 and 14. For a 5% woman not wearing a seat belt or unbelted, the two bolts 10 and 11 are unlocked by the ignition of the charges S to decouple sheet 12 and sled 13 so that none of the two load absorbers 8 and 9 act, and both pyrotechnic driving charges 47 and 48 are triggered so that the steering wheel 54 is pulled away from the female passenger as fast and far as possible. This corresponds to the illustration in FIG. 13 and in FIG. 12 of the steering wheel position in which the steering wheel 54 is further away from the seat 4 (i.e., is located further left in FIG. 12). The situation for a 95% man not wearing a seat belt (unbelted) is illustrated in FIG. 14 and in FIG. 12 with the steering wheel position in which the steering wheel 54 is closer to the seat 4 (i.e., is located further right in FIG. 12). In this case, none of the two pyrotechnic driving charges 47 and 48 is triggered so that the steering wheel 1 is not actively moved away from the driver and both load absorbers 8 and 9 remain effective by not unlocking the bolts 10 and 11 to provide a maximum load absorbency when the driver or his head is hitting the steering wheel 1. In FIG. 12, different distances of the seat 4 to the lower telescopic pad 55 of the steering column in the eases of the 5% woman not wearing a seat belt and the 95% man not wearing a seat belt are not taken into consideration.

Figure 15:
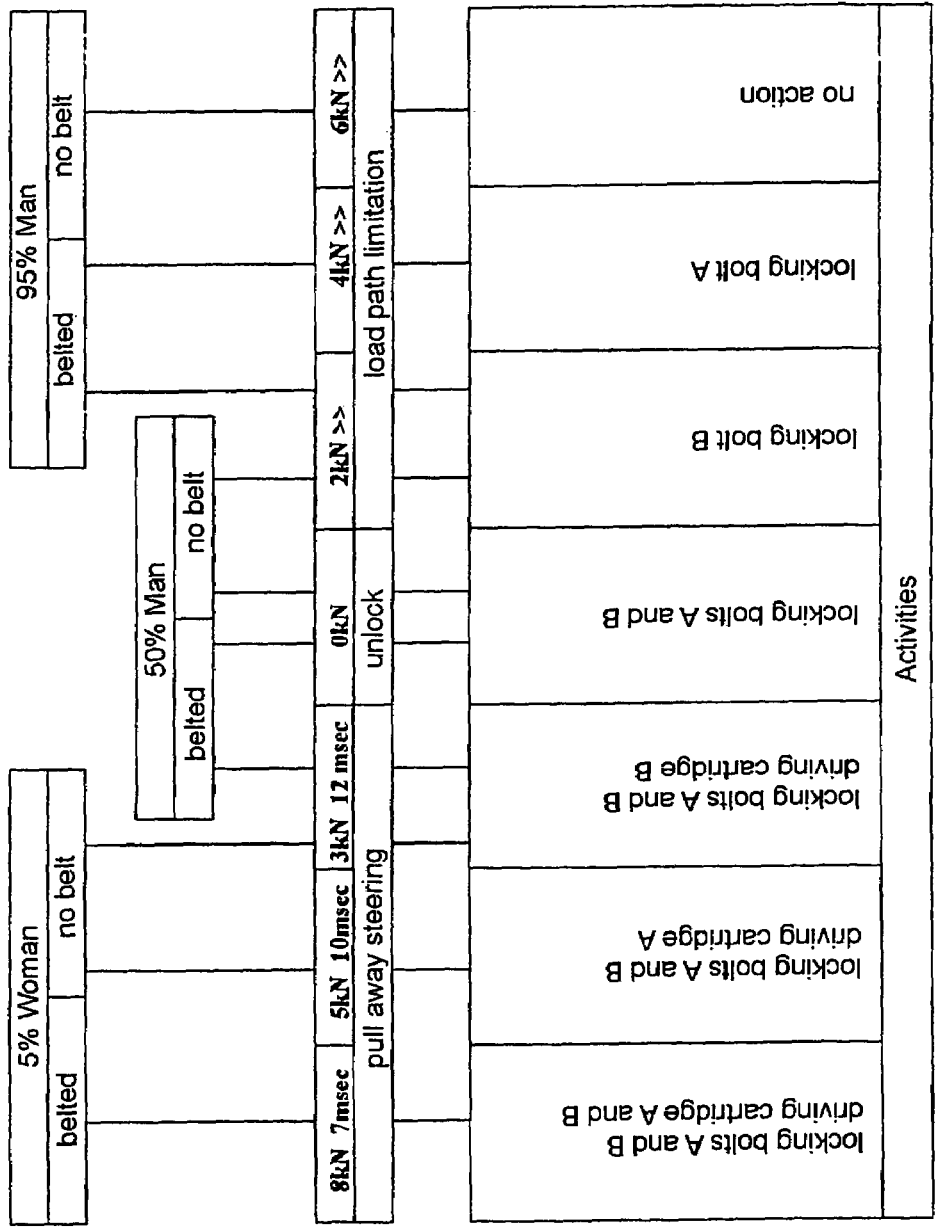
FIG. 15 is a diagram for illustration of different operation modes of the steering column of the third embodiment example, and FIG. 16 schematically shows a switching and construction scheme of the adjustment means and the control belonging thereto, of a forth embodiment example of the steering column.

The above mentioned and further operation cases of the steering column 1 are illustrated in the diagram of FIG. 15. "Locking bolts A and B" thereby means that both bolts 10 and 11 are unlocked by igniting the charges S' and S" so that none of the two load absorbers 8 and 9 acts. Correspondingly "locking bolt A" and "locking bolt B" means that only the bolt 10 (charge S') or only the bolt 11 (charge S") is correspondingly unlocked so that only the less delaying load absorber 9 (B) or the more delaying load absorber 8 (A) correspondingly acts. "Driving cartridge A and B" means that both pyrotechnic driving charges or cartridges 47 and 48 are triggered so that a maximum steering wheel adjustment takes place. Correspondingly "driving cartridge A" and "driving cartridge B" mean that only the larger pyrotechnic driving charge or cartridge 48 or only the smaller pyrotechnic driving charge or cartridge 47 is triggered. A larger charge means a stronger and therefore also faster treatment of the corresponding piston and therewith a further going and/or faster retraction of the steering wheel away from the passenger.

In summary the present invention makes a safety steering column possible which in the case of a crash, for example, according to the third embodiment example, can react up to sevenfold differently, as the following table shows based on a realistic example.

TABLE I

Steering movement 100 mm with, for example, 7 load alternatives according to the invention (characteristic as needed or desired)

| safety adjustment | application case |
| --- | --- |
| steering with 8 kN pulling force to the front | 5% woman not wearing a seat belt |
| steering with 5 kN pulling force to the front | 5% woman wearing a seat belt |
| steering with 5 kN pulling force to the front | 1st alternative for 50% man not wearing a seat belt |
| 0 kN pulling force or load absorbency; steering unlocked | 2nd alternative for 50% man not wearing a seat belt |
| steering front movement with first load absorber decelerated with 2 kN | 50% man wearing a seat belt |
| steering front movement with second load absorber decelerated with 4 kN | 95% man wearing a seat belt |
| steering front movement with both load absorbers decelerated with 6 kN | 95% man not wearing a seat belt |

The new regulation Federal Motor Vehicle Safet Standards ("FMVSS") 208 and other further crash test types demand improved values for passengers and especially drivers wearing and not wearing a seat belt. In particular, for small women/woman drivers a sufficient distance has to be provided upon the triggering of the air bag to avoid the neck being broken by a triggered air bag. 25% of all ears registered in the USA after 9/2002 have to meet the new regulations, especially according to the regulation FMVSS 208. In Europe, this will be required for reasons of competition also by then.

With tall and heavy drivers, especially if they are not wearing a seat belt, the air bag is not sufficient anymore. Then the steering column has to absorb additional energy. Furthermore, additional measures are basically required especially for passengers and especially drivers not wearing a seat belt.

The present safety steering includes, e.g., additional 6 possibilities to act positively on the driver in the case of a crash compared to prior load absorbers (tailor-made for the 95% man wearing a seat belt). Therefore, "wearing a seat belt" or "not wearing a seat belt" is being detected by a switch in the seat belt buckle. A corresponding equipment in future vehicles will simultaneously be usable, for example, for determining an air bag triggering threshold. Furthermore, future vehicles can easily be equipped with seat belt usage, seat occupation, weight and position detection of the passengers' seats and especially of the driver seat.

In connection, for example, with an air bag system relating to the present applicant/owner, in which a mechanism independent of the air bag pressure opens a lid covering the air bag as long as it has not been triggered that the air bag can "softly" deploy, it is possible that, e.g., only a potentiometer, for example, in a driver seat rail is sufficient for the detection of the driver's size.

After detection of the driver's size and his seat belt situation one of the 7 crash optimizations is switched (see Table I and also FIG. 15). With a small driver not wearing a seat belt, the steering is pulled away from the head up to 100 mm, e.g., with 8 kN just before the expansion of the air bag within about 5 msec. Therefore both pistons are pyrotechnically driven to the front and the load restrictors are unlocked to their ineffectiveness by pyrotechnic locking bolts. At the upper end of the scale, 2 load absorbers (e.g., together 6 kN) are assigned to the tall man not wearing a seat belt. The locking bolts for the load restrictors are not unlocked and the steering is not pulled downwards either by not igniting the pyrotechnic cartridges. Five further possible switchings lie between these two extremes (see Table I and FIG. 15).

Pulling away the steering has to be constructively possible. The ignition key should also be moved onto the circuit console because of a possible impact of the knee.

One has to consider that a reduction of a passenger's and especially a driver's distance of 1 cm until an impact would mean at least 1 kg of structural measures in the upper front of a vehicle without the present invention. This is verified by the safety steering according to the present invention in a better way with lower weight and less costs.

Figure 16:
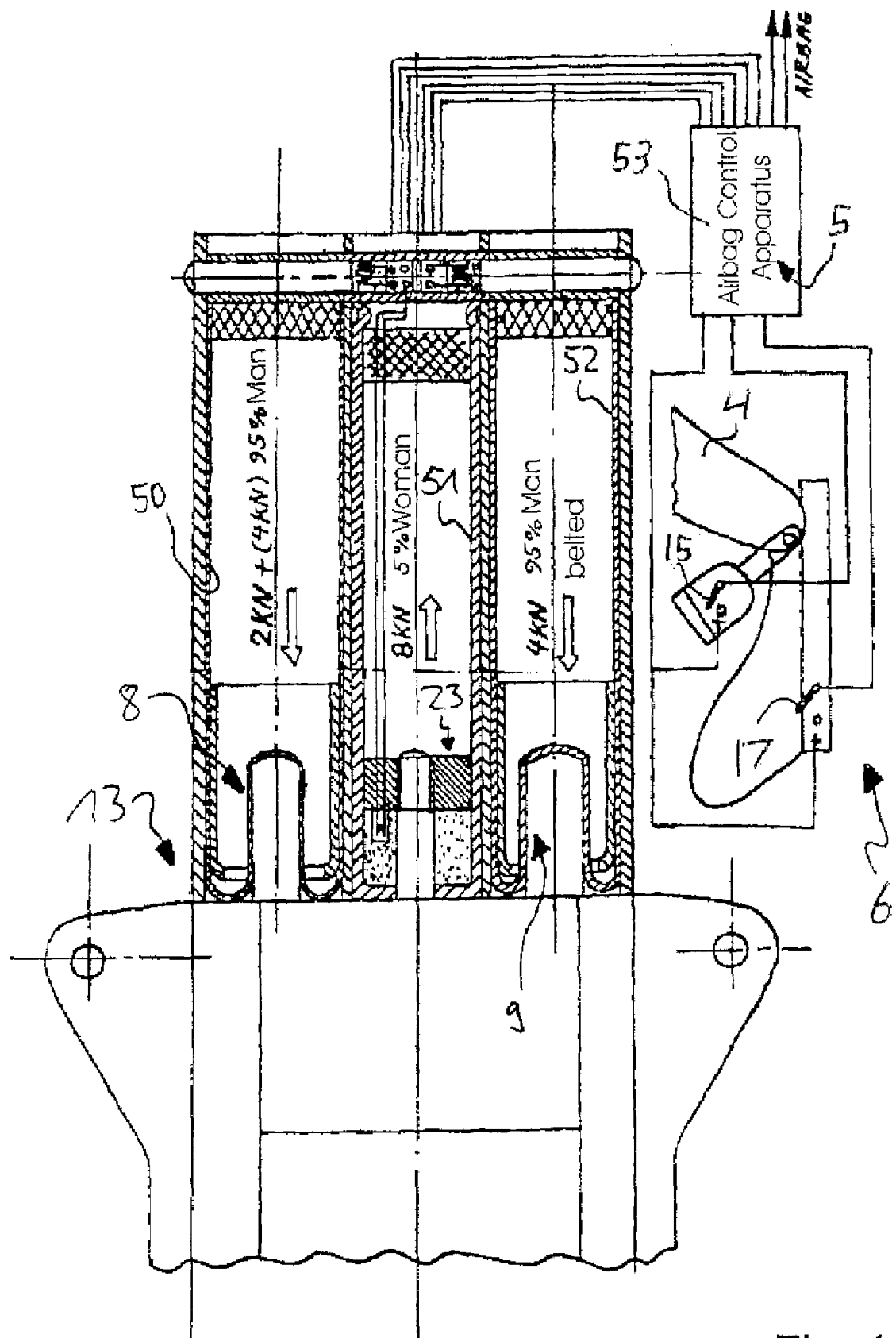

FIG. 16 shows another alternative of the invention as fourth embodiment example with three pipes or cylinders 50, 51 and 52 in a design attached to the steering sled or carriage 13. In the pipe 50 a stronger load absorber 8 (A) is included. A weaker load absorber 9 (B) is located in the pipe 52 and driving means 23 act in the pipe 51. Therewith at least three different load absorbing stages plus one operation type without load absorbency and without active steering wheel retraction as well as an operation mode with an active steering wheel retraction can be realized. Examples for the different cases are stated in FIG. 12. Furthermore, the seat 4 and detection means 6 with a seat belt usage switch 15 and a position switch 17 connected to an air bag controller 53 which includes the control 5 and also controls the triggering of an air bag (not shown), are schematically partially shown.

In summary, the present invention makes possible amongst other things individually or in combination a safety steering column and the operation thereof wherein in the case of a crash an adaptation to three requirements is possible:

1. The steering column "reacts" to the concrete passenger's situation.
2. The steering column covers the complete range of 5% woman to 95% man wearing or not wearing a seat belt.
3. Smaller people have more distance to an air bag, or differently spoken, a larger air bag employment space exists for a 5% woman.
4. With tall people not wearing a seat belt, a large load peak reduction takes place or, differently spoken, an excessive load for a 95% man is absorbed.

This is achieved by a control of the steering wheel front movement (away from the passenger) in, for example, 4 stages according to force/time and by, e.g., a three-stage steering wheel load absorbency characteristics.

The features and combinations of features presented above and in the figures of the embodiment example only serve for exemplary explanation of the invention and not for restriction thereof. The scope of the disclosure of the present entire documentation is determined by what is evident to an ordinary person skilled in the art from the claims, but also from the description, the figures and the entire contents of the prior applications of the present applicant included by reference. In particular, the invention also encompasses all variations, modifications and substitutions that the ordinary person skilled in the art can derive from the entire scope of the disclosure of the present documents. In particular, all individual properties and potential configurations of the invention and the embodiment examples thereof can be combined with each other.

What is claimed is:

1. A safety steering column system for a motor vehicle that is selectively configured upon entry into the motor vehicle of a driver in the event of an accident to control the movement of at least a steering wheel end region of a steering column away from the driver of the vehicle correlated to a driver's configuring parameters comprising
   (a) the steering column comprised of an upper and a lower telescoping part with the upper part including the steering wheel end region, with the telescoping parts of the steering column being mounted for telescoping toward the front of the vehicle,
   (b) an adjustment mechanism intercoupling the telescoping parts of the steering column,
   (c) a first sensing device for sensing a physical parameter related to the size of the driver when the driver has entered the motor vehicle and providing a first configuring output,
   (d) a second sensing device for sensing a seat belt parameter of whether the driver who is when seated in the motor vehicle has a seat belt fastened and providing a second configuring output,
   (e) the adjustment mechanism including
      (i) a lockable load absorber,
      (ii) a triggerable unlocking device associated with the load absorber that when triggered unlocks the load absorber, and
      (iii) at least one triggerable operator that when triggered positively moves the telescoping pads of the steering column together away from the driver, and
   (f) a controller for receiving the outputs from the sensing devices and responsive to the received outputs for configuring the adjustment mechanism, when the driver enters the motor vehicle and prior to any accident, by controlling the triggerable unlocking device and the triggerable operator so that the adjustment mechanism operates to operate according to one of at least three preselected different and distinct operations.

2. The safety steering column system according to claim 1, wherein the adjustment mechanism includes an energy generator for the operator.

3. The safety steering column system according to claim 2, wherein the energy generator is of a pyrotechnic gas generator.

4. The safety steering column system according to claim 1, wherein a pair of lockable load absorbers are provided, capable of being operated individually or simultaneously.

5. The safety steering column system according to claim 4 wherein the load absorbers have different absorbencies.

6. The safety steering column system according to claim 1, wherein the load absorber includes a deformation member.

7. The safety steering column system according to claim 6, wherein the deformation member is comprised of one of a cutting knife, bolts, and a deceleration carriage having at least two deceleration force steps.

8. The safety steering column system according to claim 1, wherein the first and second sensing devices provide outputs to the controller of the driver's seat position, and seat-belt fastened status.

9. The safety steering column system according to claim 1, wherein the controller triggers the operator in dependence on the drivers seat position.

10. The safety steering column system according to claim 1, wherein the controller is responsive to a sensed output that is indicative of a predetermined distance or less between the driver and the steering wheel end region to condition the adjustment mechanism to trigger in case of an accident.

11. The safety steering column system according to claim 1, wherein the controller conditions the load absorber responsive to the output of the sensor for one of the drivers seat belt fastening status and seat position.

12. The safety steering column system according to claim 1, wherein the controller conditions the adjustment mechanism in the case of an accident by unlocking the load absorber responsive to the driver not wearing the seat belt.

13. The safety steering column system according to claim 1, wherein the first sensing device includes a switch juxtaposed with respect to seat guiding rails to sense seat position.

14. The safety steering column system according to claim 1, wherein the second sensing device includes a buckle usage switch juxtaposed with respect to the seat belt buckle for the driver's seat belt to sense its status.

15. A safety steering column system according to claim 1 wherein the load absorber includes an ignitable pyrotechnic piston-cylinder to move the upper part of the telescopic steering column down.

16. A safety steering column system for a motor vehicle that is selectively configured upon entry into the motor vehicle of a driver in the event of an accident to control the movement of at least a steering wheel end region of the steering column away from the driver of the vehicle correlated to a driver's configuring parameters comprising,
   (a) the steering column comprised of an upper and a lower telescoping part with the upper part including the steering wheel end region, with the telescoping parts of the steering column being mounted for telescoping toward the front of the vehicle,
   (b) an adjustment mechanism intercoupling the telescoping parts of the steering column,
   (c) a first sensing device for sensing a physical parameter related to the size of the driver when the driver has entered the motor vehicle and providing a first configuring output,
   (d) a second sensing device for sensing a seat belt parameter of whether the driver who is seated in the motor vehicle has a seat belt fastened and providing a second configuring output,
   (e) the adjustment mechanism including
      (i) a pair of load absorbers having different load absorbency,
      (ii) a lock associated with each load absorber,
      (iii) a triggerable unlocking device associated with each lock that when triggered unlocks the associated lock, and
      (iv) at least one operator including a triggerable device to generate energy for the operator so that when the device is triggered and energy is generated to drive the operator, the operator will positively move the telescoping parts of the steering column together away from the driver, and (f) a controller for receiving the outputs from the sensing devices and responsive to the received outputs for configuring the adjustment mechanism, when the driver enters the motor vehicle and prior to any accident, by controlling the two triggerable unlocking devices and the triggerable operator so that the adjustment mechanism operates to operate according to one of at least three preselected different and distinct operations.

17. The safety steering column system according to claim 16, wherein the adjustment mechanism includes an energy generator for the operator.

18. The safety steering column system according to claim 17, wherein the energy generator is a pyrotechnic gas generator.

19. The safety steering column system according to claim 16, wherein the load absorbers include a deformation member.

20. The safety steering column system according to claim 19, wherein the deformation members are comprised of one of bolts, and a deceleration carriage having at least two deceleration force steps.

21. The safety steering column system according to claim 16, wherein the first and second sensing devices provide outputs to the controller of the driver's seat position, and and seat belt fastened status.

22. The safety steering column system according to claim 16, wherein the controller triggers the operator in dependence on the driver's seat position.

23. The safety steering column system according to claim 16, wherein the controller is responsive to a sensed output that is indicative of a predetermined distance or less between the driver and the steering wheel end region to condition the adjustment mechanism to trigger in case of an accident.

24. The safety steering column system according to claim 16, wherein the controller conditions the load absorbers responsive to the output of the sensor for one of the driver's seat belt fastening status and seat position.

25. The safety steering column system according to claim 16 wherein the controller conditions the adjustment mechanism in the case of an accident by unlocking at least one of the load absorbers responsive to the driver not wearing a seat belt.

26. The safety steering column system according to claim 16 wherein the first sensing device includes a switch juxtaposed with respect to seat guiding rails to sense seat position.

27. The safety steering column system according to claim 16, wherein the second sensing device includes a buckle usage switch juxtaposed with respect to the seat belt buckle for the driver's seat belt to sense its status.

28. A safety steering column system according to claim 16 wherein the load absorbers are fixed relative to the vehicle on one side and attached to the upper part of the steering column on its other side by controllable releasable fasteners.

29. A safety steering column system according to claim 28 wherein the controllable releasable fasteners are pyrotechnic ignitable fasteners ignitable by the controller.

30. A safety telescopic steering column system for a motor vehicle in which an upper part of the telescopic steering column telescopes with respect to a lower part that is fixed relative to the vehicle comprising;

a detector that receives input correlated with parameters related to a driver of the vehicle;

a coupling including at least one lockable load absorber, the coupling interconnecting the telescoping parts of the steering column, the coupling capable of being arranged in a plurality of different operative configurations, wherein the at least one load absorber is composed of a deformable sheet metal plate member provided with a tearing seam, such that a load is absorbed by deforming the deformable sheet metal plate member, including tearing the deforming the deformable sheet metal plate member at the tearing seam; and a controller responsive to the input to the detector to selectively pre-configure the coupling from among the different operative configurations upon a driver entering the vehicle and prior to an accident happening.

31. A safety steering column system according to claim 30 wherein the coupling includes a plurality of lockable load absorbers.

32. A safety steering column system according to claim 31 wherein the plurality of lockable load absorbers are tailored to several load absorber levels.

33. A safety steering column system according to claim 30 wherein an ignitable pyrotechnic piston-cylinder is mounted in parallel to the coupling, and controlled by the controller to move the upper part of the telescopic steering column down.

34. A safety steering column system according to claim 30 wherein the controller switches the at least one load absorber between locked and unlocked conditions.

35. A safety steering column system according to claim 34 wherein electrically ignitable pyrotechnic fasteners are provided to enable switching between locked and unlocked conditions.

36. A safety steering column system according to claim 30 wherein the controller switches the at least one load absorber in steps.

37. A safety steering column system according to claim 30 wherein said at least one lockable load absorber is composed of sheet metal members of bent metal configuration provided with tearing seams.

38. A safety steering column system according to claim 30 wherein said at least one load absorber is fixed relative to the vehicle on one side and attached to the upper part of the steering column on its other side by at least one controllable releasable fastener.

39. A safety steering column system according to claim 30 wherein said at least one load absorber is fixed relative to the vehicle on one side and attached to the upper part of the steering column on its other side by at least one pyrotechnic ignitable fastener.

40. A safety steering column system according to claim 30 wherein said at least one load absorber is composed of at least one bent sheet of metal member adapted to be torn out to absorb force of a load.

41. A safety steering column system according to claim 40 wherein said at least one load is composed of a plurality of bent sheet of metal members adapted to be torn out to absorb force of a plurality of different loads.

42. A safety steering column system according to claim 40 wherein the at least one bent sheet of metal member adapted to be torn out to absorb force of a load is composed of two sections fastened together by fasteners with one section fixed relative to the vehicle and the other section attached to the upper part of the steering column, one section provided with a slot in which one of the fasteners is slidably mounted to achieve a step load absorption.

43. A safety steering column system according to claim 30 wherein said at least one load absorber includes a controllable releasable fastener for switching the load absorber between a locked condition in which it functions as a load absorber and unlocked condition in which the load absorber is inactive.

44. A safety steering column system according to claim 43 wherein said at least one load absorber includes a pyrotechnic controllable releasable fastener for switching the load absorber between the locked condition in which it functions as a load absorber and unlocked condition in which the load absorber is inactive.

45. A safety steering column system according to claim 44 wherein the pyrotechnic controllable releasable fastener is a pyrotechnic controllable releasable bolt.

46. A safety steering column system according to claim 45 wherein an ignitable pyrotechnic piston-cylinder is mounted in parallel to the load absorber, and controlled by the controller to move the upper part of the telescopic steering column down.

47. A safety steering column system according to claim 30 wherein the at least one load absorber is connected on one side by a pyrotechnic controllable releasable fastener to supporting structure.

48. A safety steering column system according to claim 30 wherein a power unit is mounted in parallel to the coupling, and controlled by the controller to move the upper part of the telescopic steering column down.

49. A safety steering column system according to claim 48 wherein the power unit includes a mechanism to prevent reversal.

50. A method of operating a safety steering column system comprising the steps of
  a. providing a safety telescopic steering column system for a motor vehicle in which an upper part of the telescopic steering column telescopes with respect to a lower part that is fixed relative to the vehicle;
  b. detecting input correlated with parameters related to a driver of the vehicle;
  c. interconnecting the telescoping parts of the steering column in a way that provides a plurality of different operative configurations;
  d. controlling the selection of a configuration of the coupling from among the different operative configurations responsive to the detected input upon a driver entering the vehicle and prior to the happening of an accident,
wherein the interconnecting step includes load absorption, and the further step of conditioning the load absorption for active or inactive operation.

51. A method of operating a safety steering column system according to claim 50 including the further step of moving the upper part of the telescopic steering column down responsive to an accident and inactivation of all load absorption.

52. A method of operating a safety steering column system according to claim 51 including the further step of reverse blocking of the upper part of the telescopic steering column after having moved down.

53. A method of operating a safety steering column system according to claim 50 wherein the load absorption occurs at different load levels.

54. A method of operating a safety steering column system according to claim 50 including the step of controlling switching between active and inactive operation of the load absorption by a pyrotechnic generation of force.

55. A method of operating a safety steering column system according to claim 50 wherein the load absorption is achieved by a tearing of metal.

56. A method of operating a safety steering column system according to claim 50 wherein the load absorption is achieved by a deforming of metal.

57. A method of operating a safety steering column system according to claim 50 wherein the load absorption is conditioned to remain active by a locking action.

58. A method of operating a safety steering column system according to claim 50 wherein the load absorption is rendered inactive by an unlocking action.

* * * * *